(12) United States Patent
Pons Jiménez et al.

(10) Patent No.: US 11,384,187 B2
(45) Date of Patent: Jul. 12, 2022

(54) PROCESS TO OBTAIN RANDOM TERPOLYMERS DERIVED FROM ITACONIC ACID, ACONITIC ACID AND/OR ITS ISOMERS, AND ALKENYL SULFONATES AND USE OF THE PRODUCT THEREOF

(71) Applicant: INSTITUTO MEXICANO DEL PETRÓLEO, Mexico City (MX)

(72) Inventors: Mirna Pons Jiménez, Mexico City (MX); Raúl Hernández Altamirano, Mexico City (MX); José Manuel Martínez Magadan, Mexico City (MX); Alejandro Ramirez Estrada, Mexico City (MX); Luis Silvestre Zamudio Rivera, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 672 days.

(21) Appl. No.: 15/129,245

(22) PCT Filed: Mar. 13, 2015

(86) PCT No.: PCT/MX2015/000042
§ 371 (c)(1),
(2) Date: Sep. 26, 2016

(87) PCT Pub. No.: WO2015/147623
PCT Pub. Date: Oct. 1, 2015

(65) Prior Publication Data
US 2017/0121440 A1 May 4, 2017

(30) Foreign Application Priority Data
Mar. 25, 2014 (MX) .................. MX/a/2014/003577

(51) Int. Cl.
*C08F 222/02* (2006.01)
*C08F 2/10* (2006.01)
*C02F 5/10* (2006.01)
*C02F 103/02* (2006.01)

(52) U.S. Cl.
CPC .............. *C08F 222/02* (2013.01); *C02F 5/10* (2013.01); *C08F 2/10* (2013.01); *C02F 2103/023* (2013.01); *C02F 2303/08* (2013.01)

(58) Field of Classification Search
CPC .............. C02F 5/10; C08F 222/02; C08F 2/10
See application file for complete search history.

(56) References Cited

U.S. PATENT DOCUMENTS

2011/0224393 A1* 9/2011 Durant .................. C08F 22/02
526/318.2

FOREIGN PATENT DOCUMENTS

CN         101830571    *  9/2010

OTHER PUBLICATIONS http://www.aqion.de/site/192; Nov. 2015.*
CN 101830571; machine translation of claims and description; Sep. 2010.*
Cornucopian Cylindrical Aggegate Morphologies from Self-Assembly of Amphiphilic Triblock Copolymer in Selective Media (Journal of Physical Chemistry B, 2005, 109, 21549-21555).
Density Functional Calculations, Synthesis, and Characterization of Two Novel Quadruple Hydrogen-Bonded Supramolecular Complexes (Journal of Physical Chemistry A, 2004, 108, 5.
Strong Decrease of the Benzene-Ammonium Ion Interaction upon Complexation with a Carboxylate Anion (Journal of American Chemical Society, 1999, 121, 2303-2306.
J. Phys. Chem. A 1998, 102, 2838-2841.
G. E. Geiger, Water & Process Technology, 2006, 1-7, "New Non-Phosphorous Calcium Carbonate Inhibitor Reduces Phosphorus Levels and Overcomes Limitations of Phosphonates".
Ruenradee Prachasri, "Developing a New Environmentally Acceptable Non-Phosphorus Cooling Water Treatment Program", Electricity Generating Authority of Thailand, Nonthaburi.
W. Wang, A. T. Kan, M. B. Tomson, SPE 155108, 2012, 1-16; A Novel and Comprehensive Study and Polymeric and Traditional Phosphonate inhibitors for High Temperature Scale C.
F. H. Browning, H. S. Fogler, Langmuir 1995, 11, 4143-52; "Effect of synthesis parameters on the properties of calcium phosphonate precipitates".
Separation Science and Technology, 42, 2007, 1639-1649; Degradation of Phosphonate-Based Scale Inhibitor Additives in the Presence of Oxidizing Biocides: Collateral Damagage.
"Binding of Calcium and Carbonate to Polyacrylates" (Journal of Physical Chemistry B 2009, 113, 7081-7085).

(Continued)

*Primary Examiner* — Peter D. Mulcahy
(74) *Attorney, Agent, or Firm* — Jason P. Mueller; FisherBroyles, LLP

(57) ABSTRACT

The present invention is related to the process of obtaining random terpolymers based on itaconic acid or its isomers, aconitic acid or their isomers and sodium alkenyl sulphonates, through a polymerization in aqueous solution, via free radicals at acid pH in the range of 1.0 to 3.5 and as initiator a redox system. The random terpolymers are characterized for being tolerant to high concentrations of divalent ions, such as calcium, magnesium, strontium and barium. Their use as inhibitors of mineral scale such as calcium carbonate, calcium sulphate, strontium and barium, and clay dispersing, iron oxides, carbonate and calcium sulfate allows for their application in the reservoir or production rig, treated water, sea water and/or connate water can be used as means of transportation. The terpolymer can be used to inhibit and disperse mineral scales present in cooling system and boiler employed in the chemical and oil industry, and is compliant with environmental standards established internationally. They are classified as non-toxic, and can be used in pipes and equipment in the petrochemical industry and transporting freshwater and seawater from offshore and onshore facilities.

6 Claims, 16 Drawing Sheets

(56) References Cited

OTHER PUBLICATIONS

"Control of Crystal Nucleation and Growth of Calcium Carbonate by Shyntetic Substrates" (Chemistry of Materials 2001, 13, 3245-3259).
"A new Design Strategy for Molecular Recognition in heterogeneous Systems: A Universal Crystal-Face Growth Inhibitors for Barium Sulfate", Peter V. et al. (J. Am. Chem. Soc. 2, 2000.
"At the Interface of Organic and Inorganic Chemistry: Bioinspired Synthesis of Composite Materials (Chemistry of Materials 2001, 13, 3227-3235)".

* cited by examiner

Figure 4
| | Composition %weight | MEB Images |
|---|---|---|
| a | 30.04 % Ca<br>20.72 % S<br>49.25 % O | 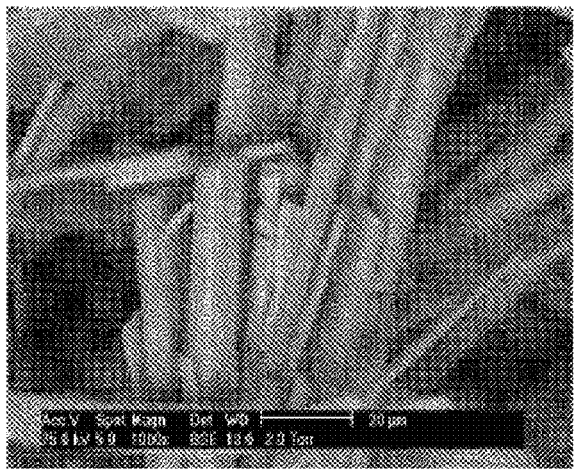 |
| b | 20.34 % Ca<br>14.56 % S<br>12.67 % Na<br>18.75 % Cl<br>33.69 % O | 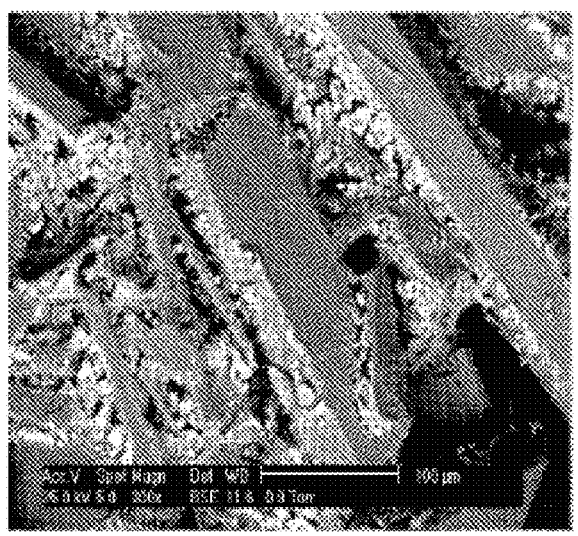 |

Figure 5
| | Composition %weight | MEB images |
|---|---|---|
| a | 47.53% Ca<br>14.34% C<br>1.23% Cl<br>36.9% O | 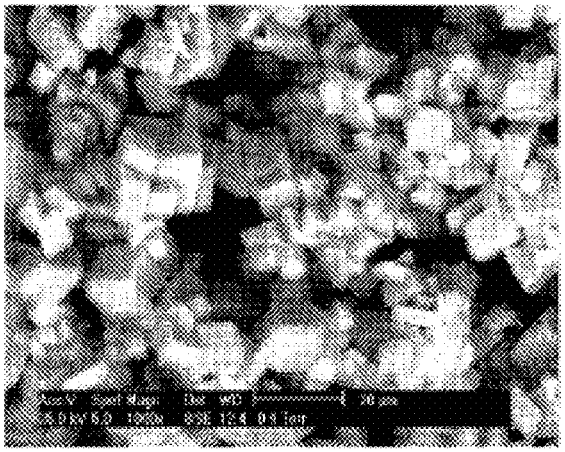 |
| b | 54.5 % Ca<br>13.7 % C<br>2.06 % Cl<br>29.24% O<br>0.53 % S | 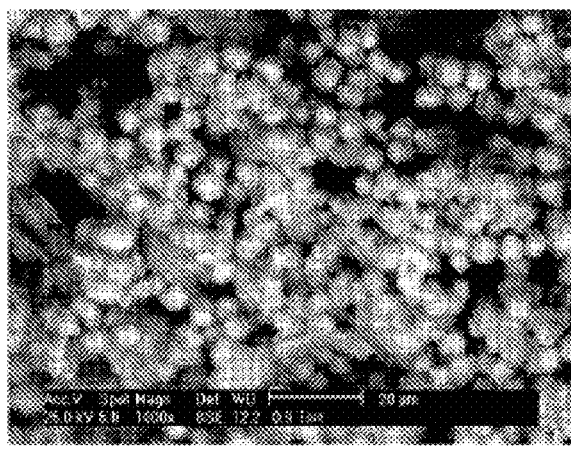 |

Figure 11
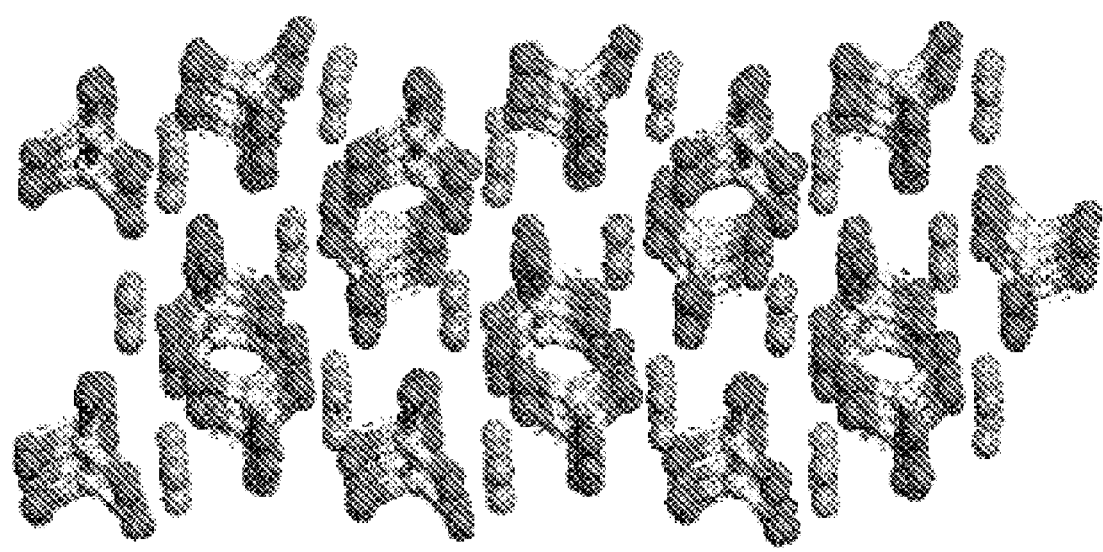
 Oxygen Atoms  Barium Atoms
 Sulfur Atoms Figure 15
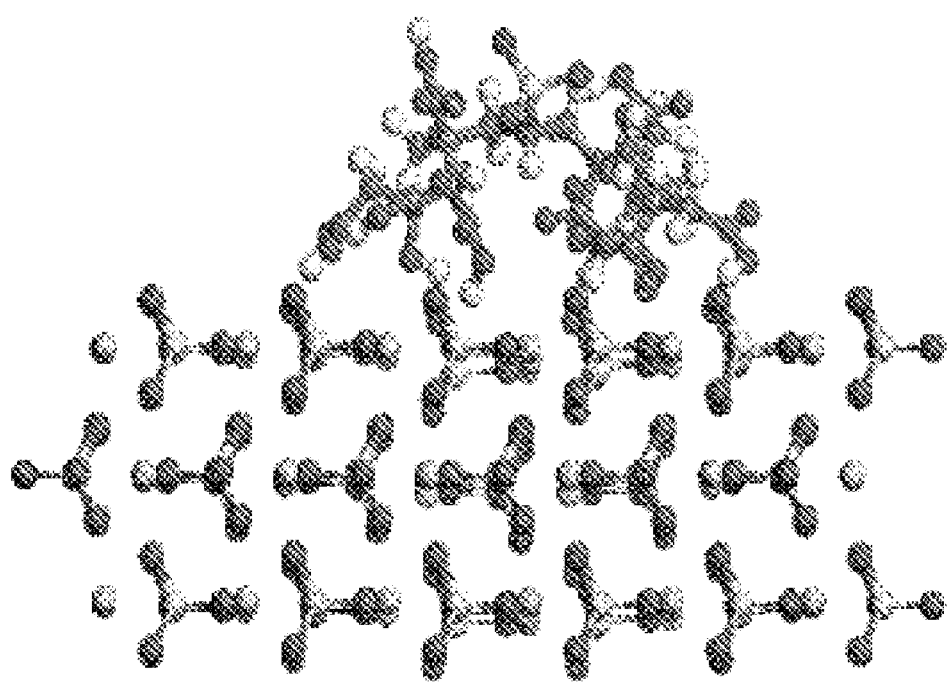
 Oxygen Atoms  Hydrogen Atoms
 Sulfur Atoms  Calcium Atoms
 Carbon Atoms  Sodium Atoms PROCESS TO OBTAIN RANDOM TERPOLYMERS DERIVED FROM ITACONIC ACID, ACONITIC ACID AND/OR ITS ISOMERS, AND ALKENYL SULFONATES AND USE OF THE PRODUCT THEREOF

CROSS-REFERENCE TO RELATED APPLICATIONS

This application is the National Stage entry of International Application No. PCT/MX2015/000042, filed Mar. 13, 2015, which claims benefit of Mexican Priority Application MX/a/2014/003577 filed Mar. 25, 2014, both of which are incorporated herein in their entirety by reference thereto.

FIELD OF THE INVENTION

The present invention is related to the process for obtaining random terpolymers derived from itaconic acid, aconitic acid and/or its isomers, and sodium alkenyl sulfonates through a free radical polymerization at an acid pH involving a redox system as initiator and their use in the inhibition of mineral scales like calcium carbonate, sulphates of calcium, strontium and barium, likewise dispersing of calcium carbonate, sulfate calcium, iron oxides and clays are also shown. The random terpolymers prevent and control the formation damage and rig production obstruction in the hydrocarbon extractive industry, which are caused by mineral salt deposits present in oilfields due the high salinity of formation water, pressure, temperatures and pH changes. Random terpolymers are used to inhibit and disperse mineral scales present in cooling systems and industrial boilers used in the oil and chemical industry. Likewise are characterized by being tolerant to high concentrations of divalent ions, such as calcium, magnesium, strontium and barium. In other hand for application in the field or on the production rig, treated water can be used as a means of transport like sea water or feature water from the site. Moreover, terpolymers of the present invention containing low toxicity are being employed under high temperature.

BACKGROUND OF THE INVENTION

The formation of scales in areas possessing low (matrix) and high (fractures) conductivity of oilfields, as well as systems oil drilling, production systems, surface equipment, boilers and cooling systems greatly contributes in the presented problems in petroleum operations.

The most mineral scales found in the oil fields are formed by precipitation of ions present in the formation water as mineral phases, or well as a result of produced water which becomes supersaturated in mineral components when two types of streams, are incompatible and in contact (water-injection formation water), in the bottom of the well or in the rock formation. Whenever that a well is producing water, or using injection water as a method of recovery, arises the possibility that mineral scale formation take place.

The formation damage is defined as the partial or total blockage derived from natural or induced conditions presented in the rock to fluid flow from the producing formation (oil and gas) into the well or vice versa, is a problem that can occur in the different stages of the oil recovery and production operations as a result of a change in the most important petrophysical properties of the rock such as the effective porosity and absolute permeability. The formation damage can be occur naturally or due to induced conditions by the employed fluids in the operations carried out in wells, such as drilling, cementing, completion, repair, production stimulation treatment and water injection or gas.

Mineral scales can be developed in the pores of the formation near to the well, thus, the porosity and permeability of the rock look drastically reduced and can also be present in the production and injection tubing, the facts mentioned above have as consequence: formation damage from the oil reservoir, decreased production of crude oil, restriction problems with the water injection flow (pressure losses), workover of wells due to the reduction in production, corrosion in production and injection pipes and surface equipment, among others. All these problems lead to costly cleaning treatments, in addition to the replacement and maintenance of equipment and pipelines, likewise if this situation is not adequately controlled will occur the loss of a production well.

The main factors influencing the formation of these deposits are: temperature, pressure, flow rate, salinity, concentration of dissolved solids in water, pH, and others.

The mineral deposits found in areas of low (matrix) and high conductivity (fractures) into the oil reservoir are different in composition, these mainly are composed of calcium carbonate, calcium, strontium and barium sulfate, as well as iron oxides in proportions that depend of the thermodynamic conditions present in the aqueous system.

Some mineral scales, such as calcium carbonate ($CaCO_3$), can be dissolved with acid medium, but this fact depends importantly on the purity of the mineral, because generally calcium carbonate is combined with other minerals such as calcium sulfate and barium sulfate, which are very stable in acidic environments.

The contained brines in oil reservoirs have particles such as clays, and precipitates, mainly calcium compounds. The particles can be deposited and may be grown up on the surfaces, producing excessive sediment in areas possessing low water velocity, and interfering with the flow of water through the effective porosity of the oil reservoir.

For the particular case of the ancillary services area, the formation of deposits in cooling systems is one of the most important problems for the production operations in the industry. The main problems that cause mineral scale deposits are decreased heat transfer, flow restriction (pressure losses), corrosion, among others, which leads to the high cleaning costs, the replacement and maintenance of equipment and pipeline.

In worldwide to counter such problems, have been used several methods, in which stand for its efficiency and cost, chemical additives such as scale inhibitors, dispersants of inorganic salts and solvents acids either in together or independently.

Among the most common used chemicals are:

1) Sequestering agents. They function by chelation of cations ($Ca^{2+}$, $Ba^{2+}$, $Sr^{2+}$) present in the connate water so that their solubility products are not exceeded due to the concentration. One of the most used products is ethylene diamine tetra acetic acid (EDTA). The disadvantages of these products are:

a) Because these operating in stoichiometric form, a large amount of chelating agent is required, and this is undesirable from the economic viewpoint.
   b) These are effective only at low concentrations of dissolved divalent ions.

2) Poly (phosphates). The most used are sodium hexametaphosphate (NaPO3) 6, sodium tripolyphosphate ($Na_5P_3O_{10}$) and various oligo-phosphates, such as those indicated in U.S. Pat. No. 2,358,222 wherein the structural formulas are: $Na_9P_7O_{22}$, $Na_4P_2O_7$, $Na_6P_4O_{13}$, $Na_5P_3O_{10}$.

These inhibitors function in water containing moderate concentrations of calcium and near to neutral pH. The problem with poly (phosphates) is that the phosphorus-oxygen bond (PO) is often reduced and the orthophosphate ion is formed ($PO_4^{-3}$) (J. Phys. Chem. A 1998, 102, 2838-2841), which can react with calcium ions ($Ca^{2+}$) to form calcium phosphate [$CaHPO_4$ and $Ca_3(PO_4)_2$]. It has been reported in the literature (U.S. Pat. No. 4,673,508 "Inhibition of calcium phosphate scale formation with a maleate polymer" EP0267597A2 "Calcium phosphonate inhibition", U.S. Pat. No. 4,929,632 "Calcium phosphate scale methods control"), that such compounds generate problems as blockage in pipes, corrosion and decrease in heat transfer equipment when high concentrations of divalent ions, high temperature and extreme changes in pH.

3) Organophosphonates. These are compounds containing in their structure the carbon-phosphorus bond (P—C), which function through inhibition mechanism at the threshold of precipitation and the crystal modification. Organophosphonates are widely used as scale inhibitors of calcium carbonate. Among the most common are (1): 1-hydroxyethylene 1,1 diphosphonic acid (a), amino acid tri-methylene phosphonic (b) and phosphonic pentamethylene acid diethylenetriamine (c).

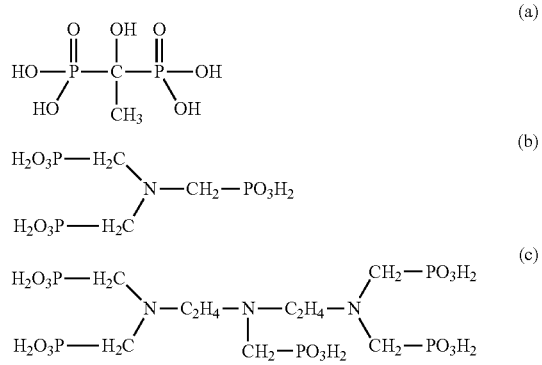

(1) Phosphate used as scale inhibitors a) ethylene 1-hydroxy 1,1-diphosphonic acid, b) tri-methylene phosphonic amino acid, c) pentamethylene phosphonic diethylene triamine acid.

Besides there are other organophosphates having application as antiscaling as is indicated in the following patent documents:

The U.S. Pat. No. 3,974,090 pointed the synthesis and use of phosphonates having the structural formula shown below:

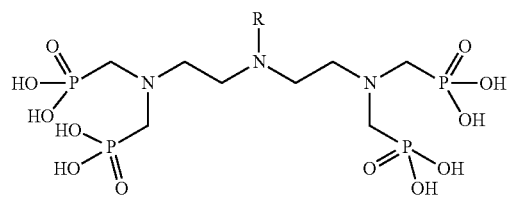

The U.S. Pat. No. 3,886,205 described and protected the synthesis and use of a scale inhibitor compound which is shown below:

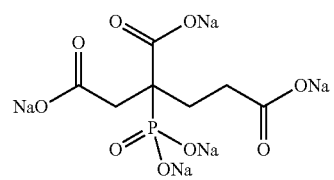

The mentioned inhibitors above have the advantage that the phosphorus-carbon bond is less susceptible to hydrolysis, but under severe operating conditions such as sudden changes in pH, high concentration of calcium ion and temperatures above 150° C. causes that these are capable to react with calcium ions to form calcium phosphates (G. E. Geiger, Water & Process Technology, 2006, 1-7, "New Non-Phosphorous Calcium Carbonate Inhibitor Reduces Phosphorus Levels and Overcomes Limitations of Phosphonates"; Ruenradee Prachasri, "Developing a New Environmentally Acceptable Non-Phosphorus Cooling Water Treatment Program", Electricity Generating Authority of Thailand, Nonthaburi 11130, Thailand; W. Wang, A. T. Kan, M. B. Tomson, SPE 155108, 2012, 1-16; "A Novel and Comprehensive Study and Polymeric and Traditional Phosphonate inhibitors for High Temperature Scale Control"; F. H. Browning, H. S. Fogler, Langmuir 1995, 11, 4143-52; "Effect of synthesis parameters on the properties of calcium phosphonate precipitates"). In Complementary way, organophosphates are susceptible to severe degradation by oxidizing biocides (Separation Science and Technology, 42, 2007, 1639-1649; "Degradation of Phosphonate-Based Scale Inhibitor Additives in the Presence of Oxidizing Biocides: "Collateral Damages" in Industrial Water Systems") and to form orthophosphate ions which can react with calcium ions present in the water and after result in calcium phosphates forms and therefore generating pipe obstruction problems and decreased heat transfer in cooling systems. Polymers. Polymeric anti scaling generally inhibit the mineral phases formation by the chemisorption on the faces of the active sites from the microcrystals, and by phenomena such as crystalline modification, dispersion, the inhibition in the threshold of precipitation and preventing growth and agglomeration of microcrystals.

Some of the most used polymers (4) are sodium poly (acrylate), sodium poly (maleic acid), sodium polyvinyl sulfonate and copolymers derived from acrylic acid-sodium vinyl sulfonate.

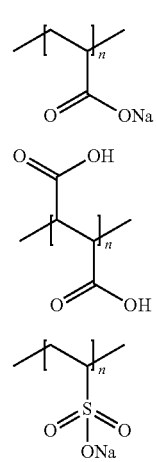

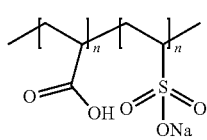

(4) Polymers used as scale inhibitors: a) sodium poly (acrylate), b) poly (maleic acid), c) sodium polyvinyl sulfonate and d) copolymer derivative from acrylic acid-sodium vinyl sulfonate.

Also, in order to create improved systems it has been developed some compositions containing various anti scaling agents among which are the following:

The MX/a/2013/004644 Mexican request patent ("Process to obtain random copolymers derived of itaconic acid and/or its isomers and alkenyl sulphonates and use of the obtained product"), described the process of obtaining random copolymers itaconic acid derivatives and/or isomers thereof and alkenyl sulphonates and their use as inhibitors/dispersants of mineral scale as calcium carbonate and calcium sulphates, barium and strontium sulphates for petroleum oil reservoirs and in the service area as the cooling systems and boilers used in the chemical and oil industry.

EP 0256057B1 European Request Patent ("Scale Inhibitor") described the use of chemical products to prevent the formation of calcium and magnesium scales in evaporation systems, boilers and water purification equipment. This patent focuses on the synergistic effect when three inhibitors are combined. The evaluations were performed using different combinations of scale inhibitors in the way to find the most effective formulation for control $CaSO_3$, $CaCO_3$ and $Mg(OH)_2$ scales. The most effective formulation consisted of two polymers (maleic polyacid and copolymer derived from styrene sulfonate and maleic acid) and also amino phosphonic acid.

U.S. Pat. No. 4,065,607 ("terpolymers of maleic anhydride and their use as scale control agents"). Described a new process for obtaining a derived terpolymer from maleic anhydride, acrylamide or methacrylamide and a third monomer compound of styrene or octene, this process uses a mixture of aromatic solvents and ketones at a temperature of 120° C. The terpolymers are useful in inhibiting calcium carbonate scale.

The EP0976911A1 European Request Patent ("Scale inhibitors"). Described a composition of commercial scale inhibitors used in extraction systems and production of hydrocarbons. The compositions contained commercial inhibitors, such as phosphonates, copolymers and based terpolymers in acid acrylic, acid phosphino-carboxylate and combined with amines phosphate esters inhibitors, since this combination provided an advantage over conventional inhibitors especially used diethylene triamine tetrametilen-fosfato. Amines of this type have the characteristic of remaining in the fluid in a wide temperature range as well as being soluble in hydrocarbons such as kerosene, diesel and heavy aromatic naphthas.

The U.S. Pat. No. 4,331,792 ("Continuous process for production of copolymer of an alkali metal vinyl sulfonate and acrylic acid"), described the continuous production process of the based copolymer in vinyl sulfonate and acrylic acid, in which the monomers are mixed and the pH adjusted to a range of 4-5.5. Furthermore, the reaction medium is combined with ammonium persulfate and sodium bisulfite as catalytic agents that promote free radical. The reaction is carried out in a tubular reactor adiabatically operated at temperatures of 140-220° C. and residence times of 5 to 7 minutes, while the resulting copolymer is removed by precipitation with methanol. Also, the patent mentioned that the obtained copolymer is useful for preventing the scales formation of calcium and magnesium.

The U.S. Pat. No. 4,710,303 ("Low molecular weight polyvinyl sulfonate for low pH barium sulfate scale control"), described a method for inhibiting the scaling with polyvinyl sulfonate and compared their effectiveness with respect to other compounds (phosphate esters, sodium hexametaphosphate, 1-hydroxyethylene-1,1-ácidodifosfonico, diethylenetriamine phosphonate, acrylic-acid copolymer maleic acid, polyacrylic acid) in a synthetic brine containing $Ba^{2+}$ and $SO_4^{2-}$ ions. Based on this method, is accurate that sodium polyvinyl sulfonate is effective in inhibiting of scales to pH=2.5-4 conditions and a temperature of 70° C. in 5-10 ppm as concentration.

The U.S. Pat. No. 5,089,150 ("Method of Increasing retention of scale inhibitors in subterranean formations") disclosed a method for crosslinking polymers acrylates base and phosphates polymer hydroxides like base make more resistant and compatible compounds in high salinity environments characteristic of underground formations. According to this patent, the key point in the stability of the inhibitors is in crosslinking polymers with polyols, which occurs by esterification of the carboxylate inhibitor and hydroxides polyalcohol, which causes to increase the molecular weight of the polymer chains, and similarly, if the polymer consists of phosphate groups. As test method they used Berea as clay rock type pre-saturated with connate water at 90° C. and injected with 2000 ppm of dissolved inhibitor in seawater per 15 percent pore volume.

The U.S. Pat. No. 8,215,398 ("Polysaccharide based scale inhibitor"), proposed a method for modifying polysaccharides, due to that derivatives from these compounds are found to be effective in inhibiting different types of deposits. The modified polysaccharide has a molecular weight of up to 500,000 AMU, also has the characteristic of being biodegradable and resistant to high temperatures. Usually is employed in the corrosion control and the mineral deposits due to its high tolerance to organic and inorganic salts such as chlorides of sodium, potassium and calcium and magnesium ions.

The US Patent Publication 2002/0150499A1 ("Oil-soluble scale inhibitors with improved formulation for environmental classification") presented information about the composition of scale inhibitors with application in hydrocarbon production systems. The formulations contained commercial inhibitors in its acid form, 2-ethyl-hexylamine (2-EHA) and the like amines. The formulations described have the advantage over conventional scale inhibitors, because they are less toxic and biodegradable.

The US Patent Publication 2005/0282712A1 ("Scale Control composition for high scaling environments") described the effectiveness of phosphonates polymers, sulfonate sodium base and unsaturated dicarboxylates, which are useful in scale control of $BaSO_4$ and $CaCO_3$ in oilfield formations.

The US Patent Publication 2007/0267193A1 ("Stimulating oilfields using different scale-inhibitors") disclosed a method for stimulating a reservoir, using scale inhibitors, with secondary recovery techniques. The method comprises injecting steam and measuring inhibitor fractions contained in the recovered fluids.

The US Patent Publication 2010/0163494A1 ("Preparation of environmentally acceptable scale inhibitors") disclosed a method for scale control using amino acids for preparing alkyl phosphonates, which are obtained by controlling the reaction of alkyl phosphonation. According to this proposal, hydrogens to be replaced (H) of each group with alkyl phosphonate amine groups (—R—PO—(OH)$_2$) these compounds are very effective in inhibiting inlays CaCO$_3$ and BaSO$_4$. However, the mono alkylated amino acids tend to be more biodegradable than the di-substituted alkyl-phosphonates amino acids.

The U.S. Pat. No. 6,924,253 B2 ("Scale removal") disclosed a method to remove scales (mainly CaCO3 and BaSO4) inside or near the production well in oil recovery processes using ionic liquids as 1-ethyl-3-tetrachloroaluminate methylimidazole, 1-butilpiridin nitrate, 1-ethyl-3-methyl imidazole tetrafluoroborate and 1-butilpiridino hexafluorophosphate.

The U.S. Pat. No. 6,995,120 ("Scale Control composition for high scaling environment) protected an inhibitory composition of calcium carbonate and/or barium sulfate scales composed of a water-soluble polymer having incorporated functionality phosphate, the polymer is formed of at least one monomer of unsaturated carboxylic acid ethylenically, at least one monomer of unsaturated vinyl sulfonate ethylenically, or a mixture thereof. Within the patent specifically is protected the terpolymer derived from the polymerization process of acrylic acid with 2-acrylamido 2-methyl propane sulfonic phosphate ester and oleyl ethoxylate.

The U.S. Pat. No. 5,282,976 ("terpolymer useful as a scale inhibitor") protected the synthesis and application as soluble antiscaling agent in water a new terpolymer derived from the polymerization process monomers of acrylic acid or methacrylic acid, vinyl acetate vinyl alcohol and sodium 1-aliloxy-2-hydroxypropyl sulfonate.

The U.S. Pat. No. 4,952,327 ("Scale Control with terpolymers containing styrene sulfonic acid") described that the scale inhibition is obtained by adding to an aqueous medium of 0.5 to 500 ppm from a copolymer containing at least one of the following three monomers: a) carboxylic acids mono unsaturated as well as their salts and anhydrides, acids containing 3 to 5 carbon atoms, such as acrylic acid, methacrylic acid maleic acid or anhydrides thereof; b) acrylamidoalkane sulfonic acids and salts thereof, such as 2-acrylamido-2-methylpropane sulfonic acid and c) styrene sulfonic acid and its salts.

The U.S. Pat. No. 4,889,637 ("Scale Control with terpolymers container containing vinyl Alcohol") described that the scale inhibition is obtained by adding to an aqueous medium of 0.5 to 500 ppm from a copolymer containing at least one of the following three monomers: a) carboxylic acids mono unsaturated as well as their salts and anhydrides, acids containing 3 to 5 carbon atoms, such as acrylic acid, methacrylic acid maleic acid or anhydrides thereof; b) acrylamidoalkane sulfonic acids and salts thereof, such as 2-acrylamido-2-methylpropane sulfonic acid and c) vinyl alcohol.

The U.S. Pat. No. 7,306,035 ("Process for treating a formation") proposed a method to increase the production of the oil reservoirs employing chemicals in the form of gels so that these, once within the formation, it encapsulated oil and facilitated their extraction. Moreover, this proposal took into account aspects such as the importance of scales control, so proposed the use of other substances as additives in the formulation of such gels.

The EP 1639228B1 European Patent ("Method for stimulating an oilfield Comprising using different scale-inhibitors") described the increased oil production by injecting water steam into the producing zone as a displacement fluid and to recover it as a compounded fluid from oil, the intent of this proposal is to make injections of fluids in different segments of the producing zone. Also contemplated the use of scale inhibitors at different concentrations and injected directly and/or diluted.

Generally, this is a production method of oil in which the injected inhibitor in different areas where improvements in the scale control is allowed.

Under the demands of the oil production processes, as well as in the area of services, specifically cooling systems and boilers, these substances must be able to work in severe operating conditions and have low toxicity.

Therefore, the development of improved mineral scales inhibitors and dispersants is a worldwide objective which is continually pursued, and is the object of the present invention.

We mention that the supramolecular chemistry is the part of the chemistry to study of systems involving aggregates of molecules or ions that are joined through noncovalent bonds, such as electrostatic interactions, coordination bonds, and hydrogen bonding interactions, π-π interactions, dispersion interactions and solvent effects.

Since the energy standpoint, the supramolecular interactions are weaker than covalent bonds, which are located in the energy range of 150 to 450 kJ/mol for single bonds. The energy range of noncovalent interactions is located from 2 kJ/mol for dispersion interactions to 300 kJ/mol for ion-ion interactions (Table 1) and the sum of several supramolecular interactions can give rise to highly stable supramolecular complexes.

TABLE 1

Strength of supramolecular interactions

| Interactions | Strength (Kj/mol) |
| --- | --- |
| Ion-ion | 200-300 |
| Ion-dipole | 50-200 |
| Dipole-dipole | 5-50 |
| Hydrogen bridge | 4-120 |
| Cation-Π | 5-80 |
| Π-Π | 0-50 |
| Van der Walls | <5 |
| Hydrophobic | The related energy with the solvent-solvent interaction |

As for the formation of supramolecular complexes from the interaction of polymers or organic compounds with mineral salts possessing scaling properties, in literature are found the following examples:

The titled article "Binding of Calcium Carbonate and to Polyacrylates" (Journal of Physical Chemistry B 2009, 113, 7081-7085) suggested that the interaction of polyacrylates with calcium carbonate is a thermodynamically favored process that gives rise to the formation of complexes, which have the characteristic of preventing the crystal growth of calcium carbonate.

The titled article "Control of Crystal Nucleation and Growth of Calcium Carbonate by Synthetic Substrates" (Chemistry of Materials 2001, 13, 3245-3259) indicated that the nucleation and growth of calcium carbonate crystals may be controlled through the use of synthetic substrates and that in such process took place the supramolecular complexes formation derived from the adsorption process of monomers or carboxylated polymers on surfaces of calcium carbonate.

The article entitled "A New Design Strategy for Molecular Recognition in heterogeneous Systems: A Universal Crystal-Face Growth Inhibitors for Barium Sulfate", Peter V. et al. (J. Am. Chem. Soc. 2000, 122, 11557-11558)

indicated that the design strategy of new additives to control scaling problems are based on the molecular recognition and that derived macrocycles from poly-aminometilfosfonatos controlled the growth in barium sulfate crystals through the complex formation.

The titled article "At the interface of Organic Chemistry and Inorganic: Bioinspired Synthesis of Composite Materials (Chemistry of Materials 2001, 13, 3227-3235)" indicated that the design of artificial models from biomineralization processes has let that research was binded in inorganic materials and supramolecular chemistry and that polyamides with carboxylate ligands can interacting with calcite crystals. Also, in the article it mentioned that block copolymers with two hydrophilic groups have been successfully used for modulating the morphology of inorganic materials such as calcium carbonate and barium sulfate.

The Computational chemistry is a tool widely used at worldwide to predict the stability and structure of chemical systems with improved and potential properties and has found application at industrial level in the development of studies about quantitative structure-activity relationship. Within the computational methods that have been employed for this purpose are presented the molecular mechanics methods, quantum methods, within which are semiempirical, ab initio and Density functional theory methods. As examples in the literature is demonstrated the use of computational chemistry to predict accurately supramolecular interactions in chemical systems, thermodynamic aspects and kinetic features of chemical processes which may be mentioned in entitled articles: 1) Cornucopian Aggregate Cylindrical morphologies from Self-Triblock Copolymer of Amphiphilic assembly in Selective Media (Journal of Physical Chemistry B, 2005, 109, 21549-21555), 2) Density Functional Calculations, Synthesis, and Characterization of Two Novel Quadruple Hydrogen-Bonded Supramolecular Complexes (Journal of Physical Chemistry A, 2004, 108, 5258-5267), 3) Strong Decrease of the Benzene-Ammonium Ion Complexation upon Interaction with a Carboxylate Anion (Journal of the American Chemical Society, 1999, 121, 2303-2306).

Is important to point that in anyone of the above references does not discuss the obtaining of random terpolymers derivative of itaconic acid and aconitic acid, and/or isomers and alkenyl sulphonates and their use in inhibiting mineral scale as calcium carbonate and sulphates barium, strontium and calcium presented by the incompatibility of water (water of injection and formation) in an oil field, as well as in the rig production from an oil well and as dispersing of clay, calcium carbonate, sulphate of barium, strontium and calcium and iron oxides presented in oil installations. The use in cooling systems and boilers present in the oil and chemical industry also it does not mention.

BRIEF DESCRIPTION OF THE DRAWINGS

In order to have a better understanding as to the application of terpolymers as inhibitors and dispersants of mineral scale of the present invention, in the following step will be referenced to the drawings made and described below:

In the FIG. #1 the infrared spectrum of the product 1 is shown.

Figure 1:
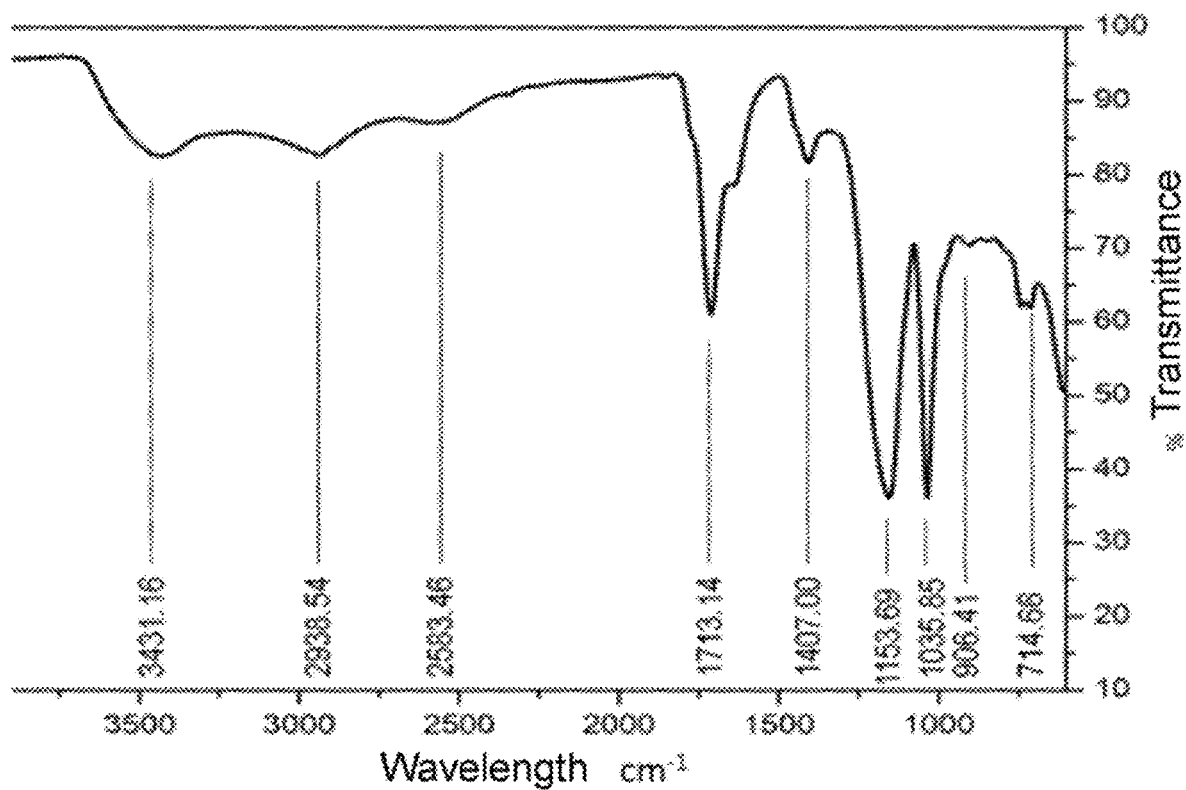
Figure 2:
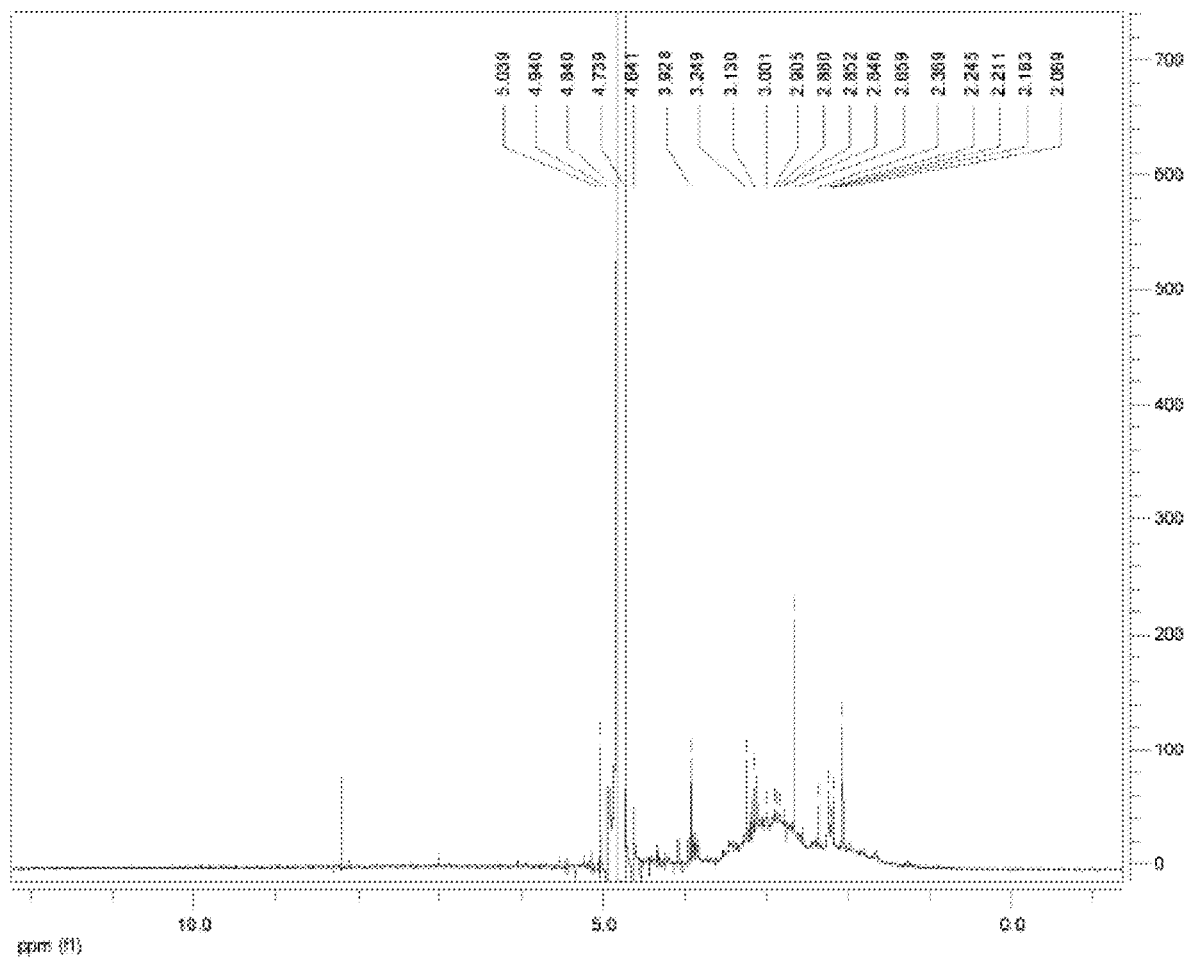
Figure 3:
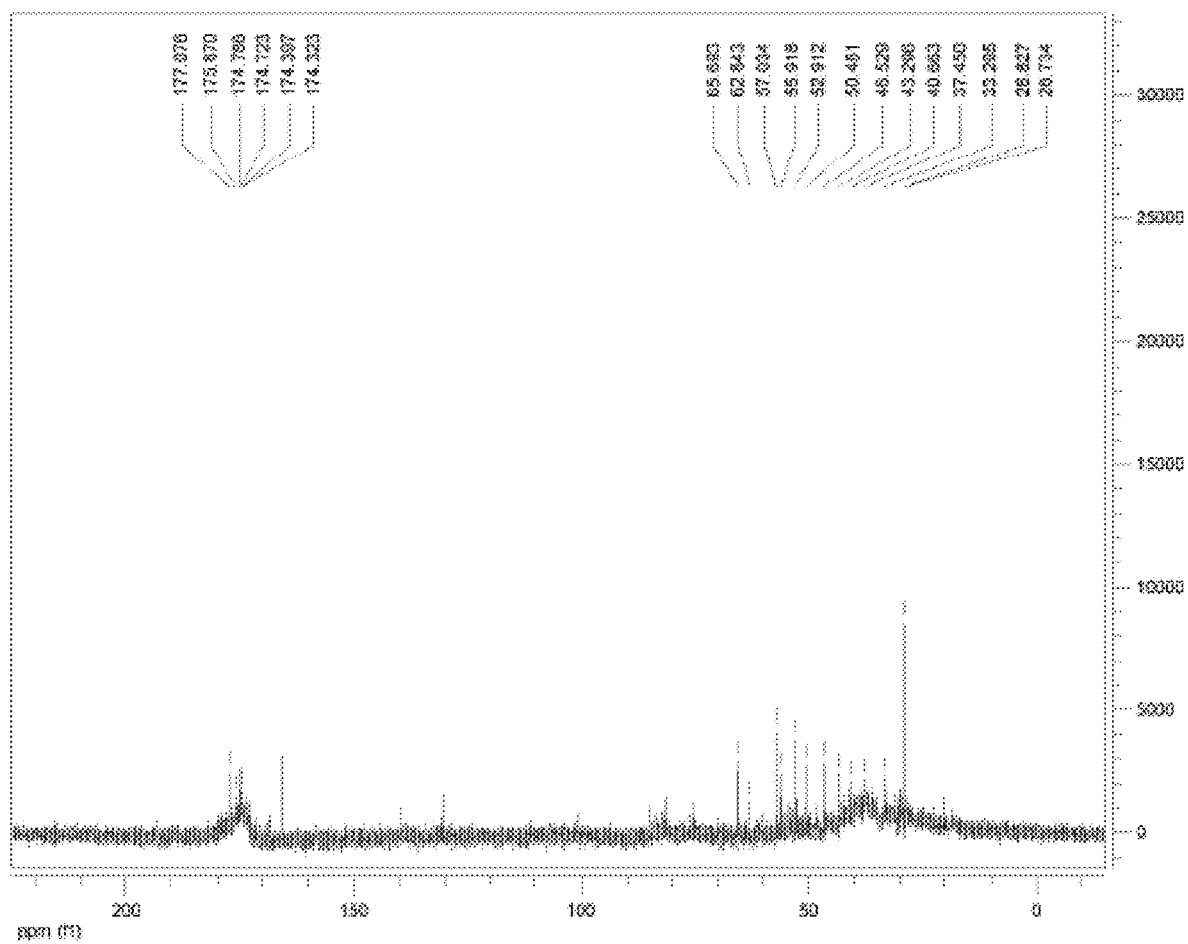

In the FIG. #2 $^1$H Nuclear Magnetic Resonance (NMR) of the product 1 is shown.

In the FIG. #3 $^{13}$C Nuclear Magnetic Resonance (NMR) of the product 1 is shown.

In the FIG. #4 morphology and composition of calcium sulfate crystals are shown, a) without chemical and b) 200 ppm of product 1.

In the FIG. #5 morphology and composition of calcium carbonate crystals are shown, a) without chemical and b) 200 ppm of product 1.

In the FIG. #6 the operation basis of a photometer are shown.

In FIG. #7, a chemical structure A representing a random terpolymer based on itaconic acid, sodium vinyl sulfonate and aconitic acid with molecular weight of 903 AMU and polydispersity index of 1 is shown.

In FIG. #8, a surface B chemical structure representing calcium carbonate crystals in their calcite polymorphic form is shown.

In FIG. #9, a supramolecular complex C obtained using computational chemistry and after the compound A surface B interaction process is shown.

In FIG. #10, a supramolecular complex C formation from compound A and surface D molecular interaction is shown.

In FIG. #11, a chemical structure of surface D representing barium sulfate crystals in its polymorphic form of barite is shown.

In FIG. #12, a supramolecular complex E obtained using computational chemistry after compound A with surface F interaction process is shown.

In FIG. #13, a supramolecular complex E formation from compound A and surface D molecular interaction is shown.

In FIG. #14, a chemical structure of the F surface representing crystals of calcium sulfate in its polymorphic form of anhydrite is shown.

In FIG. #15, a supramolecular complex G obtained using computational chemistry after compound A with surface F interaction process is shown.

In FIG. #16, a supramolecular complex G formation from compound A and surface F molecular interaction is shown.

DETAILED DESCRIPTION OF THE INVENTION

The present invention is related to the process of obtaining random terpolymers based on itaconic acid or its isomers, aconitic acid or their isomers and sodium alkenyl sulphonates of structural formula (5), through a polymerization in aqueous solution via free radicals at acid pH in the range of 1.0 to 3.5 and as initiator a redox system, and their use as inhibitors of mineral scale such as calcium carbonate, calcium sulphate, strontium and barium, and clay dispersing, iron oxides, carbonate and calcium sulfate.

The terpolymers prevent and control the formation damage and obstruction by hydrocarbons in production rigs, which are caused by mineral salt deposits present in oilfields and whose origin is the contained high salinity in formation water, incompatible mixtures of water injection and formation water, pressure changes, temperature and pH.

The terpolymers are used to inhibit and disperse presented mineral scales in cooling systems and boilers employed in the oil and chemical industry and are characterized by being tolerant to high concentrations of divalent ions, such as calcium, magnesium, strontium and barium ions and for the application in the field or in production rig, treated water, sea water and/or feature water from the site is used as a transport medium. The random terpolymers of the present invention have the characteristic of being used under high temperature, high salinity and have low toxicity.

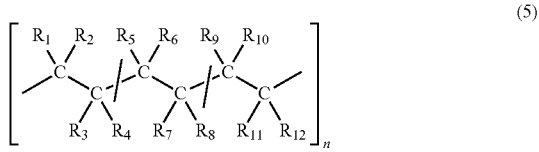

(5)

Where: $R_1$=—H, —$CH_3$, $R_2$=—H, —$CH_2COOH$, —COOH, $R_3$=—COOH, $R_4$=—$CH_2COOH$, H, $R_5$=—H, $R_6$=—H, $R_7$=—H, —$CH_3$, $R_8$=—$SO_3Na$, —$CH_2SO_3Na$, —$CONHC(CH_3)_2CH_2SO_3Na$, $C_6H_4SO_3Na$, $R_9$=H, $R_{10}$=—COOH, $R_{11}$=—COOH, $R_{12}$=—$CH_2COOH$ and n is between 2 and 70.

For the development of the present invention a method comprising the following steps was followed: 1) molecular design through computational chemistry, 2) Synthesis and characterization of random terpolymers and 3) experimental evaluation of anti-scaling and dispersant properties The selection of this methodology is based on the fact that the key to develop agents tolerant anti-scaling at high salinities and concentrations of divalent ions and able to withstand conditions of high temperatures and pressures is the understanding at the molecular level of as random terpolymers based on itaconic acid or isomers thereof, aconitic acid or their isomers and sodium alkenyl sulphonates are adsorbed on mineral salt crystals with anti-scaling properties and give rise to the supramolecular complex formation capable of:

1) Inhibiting on the threshold of precipitation just after a nucleation center is formed. The terpolymer will be adsorbed in one of the faces from the microcrystalline nucleation center in the inorganic salt and the formed ion pair will prevent the diffusion of ions to the growth centers; 2) to distort or alter the crystal lattice. If the terpolymer is adsorbed on a crystal from an inorganic salt, alterations will be occurred in the surface properties such as size, adhesion, hardness, toughness, crystal structure, etc.; consequently resulting in fragmented crystals, become amorphous, soft and slightly sticky, and therefore facilitate its removal by the continuous flow of water; and 3) to disperse. Sulfonates functional groups and di-carboxylic acids of the terpolymers will be adsorbed on the active sites of the growing crystals and through the polymer chains, repulsion effects, will be generated so steric and electrostatic which will increase the colloidal stability of the inorganic particles to keep them dispersed and avoid its agglomeration, so its removal will be provided through the continuous flow of water.

Figure 7:
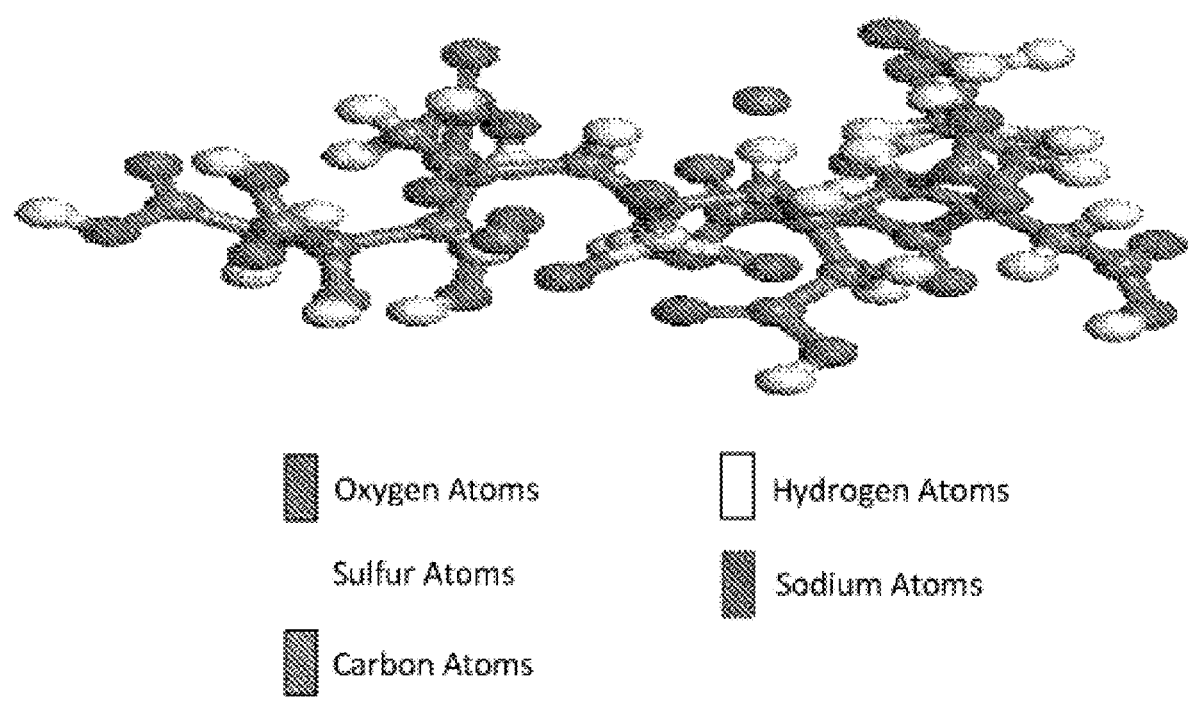
Figure 8:
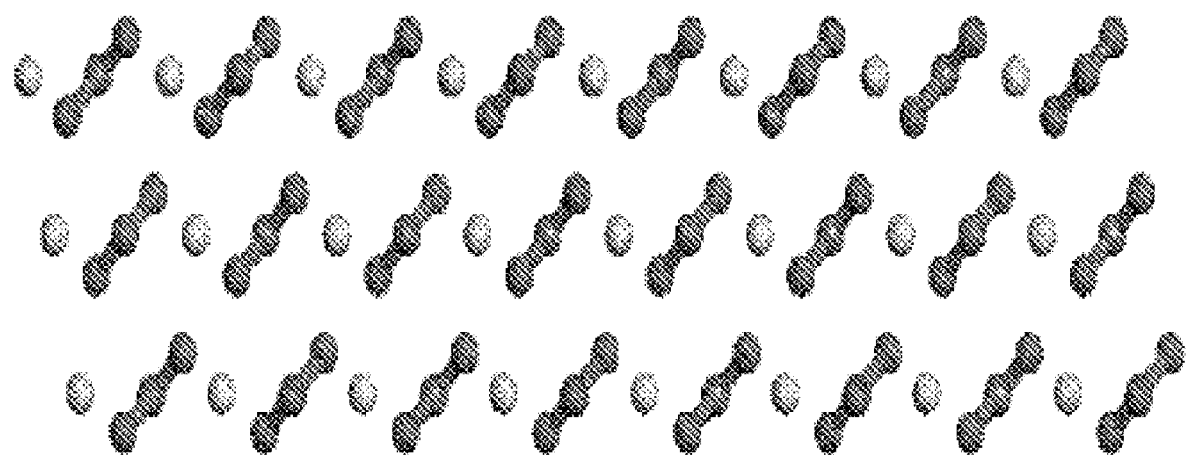
Figure 9:
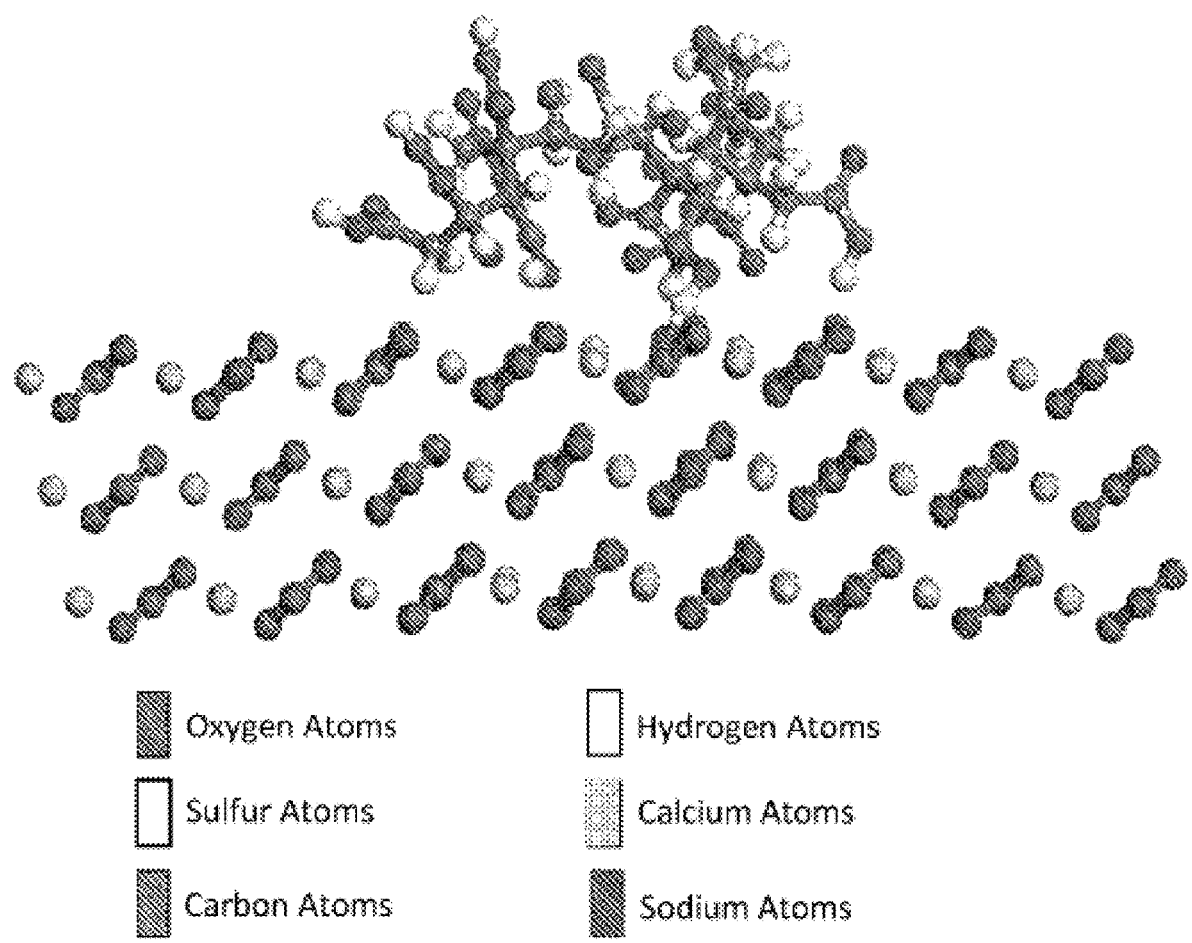
Figure 10:
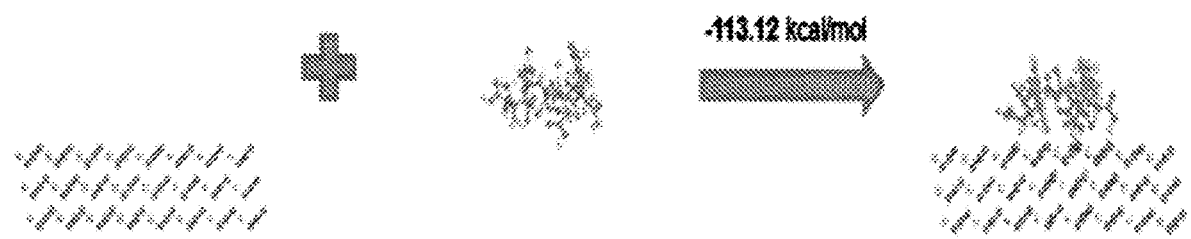

Nowadays before to develop new chemicals with improved properties, the molecule which seeks to solve a particular problem can be designed through theoretical studies of computational chemistry, according with the following explanation:

a) The chemical structure from A compound shown in FIG. 7, representing a random terpolymer based itaconic acid, sodium vinyl sulfonate and aconitic acid with 903 AMU as molecular weight and polydispersity index of 1, was used.

b) The chemical structure of the B surface shown in FIG. 8, representing calcium carbonate crystals in its polymorphic form of calcite, was used.

c) The geometries of the chemical structure of A compound and the B surface were minimized considering energy in a solvated medium by water (dielectric constant 78.54) through quantum chemical methods using Density Functional Theory and LDA-VW Functional.

d) Through computational chemistry and using a water solvated medium (dielectric constant 78.54) with quantum chemical methods using Functional Theory Density and LDA-VW Functional, the compound A was interacted with the surface B, resulting in the C supramolecular complex formation shown in FIG. 9, and the energy results that are shown in Table 2.

e) The analysis of the results in Table 2 shown that the formation of C supramolecular complex from the molecular interaction between the A compound and the B surface (9) is strongly favored from the thermodynamic point of view. Also, the interaction energy of −113.12 kcal/mol (−473.29 kJ/mol) indicated that ion-ion supramolecular interactions are presented so as well a combination of ion-dipole interactions and hydrogen bonding type.

TABLE 2

Energy of Compound A, surface B and supramolecular complex C obtained through quantum chemical methods using Density Functional Theory and LDA-VW Functional.

| | Density Functional Theory, and LDA-VW Functional | |
|---|---|---|
| Compounds or Complex | Total Energy (kcal/mol) | Interaction Energy (kcal/mol) |
| A | −2,641,697.44 | |
| B | −70,629,855.35 | |
| C | −73,271,665.91 | −113.12 |

Where:
A=Random terpolymer based on itaconic acid, sodium vinyl sulphonate and aconitic acid with molecular weight of 903 AMU and polydispersity index of 1.
B=Calcium carbonate surface in their polymorphic form of calcite.
C=Supramolecular complex derived from the interaction of the random terpolymer based on itaconic acid, sodium vinyl sulfonate and aconitic acid with molecular weight of 903 AMU and polydispersity index of 1, corresponding to compound A, as shown in FIG. 7, and the surface of calcium carbonate in its polymorphic form calcite B, as shown in FIG. 8.

Determination of the Interaction Between Random Terpolymer Based on Itaconic Acid, Sodium Vinyl Sulfonate and Aconitic Acid with Barium Sulfate.

Figure 12:
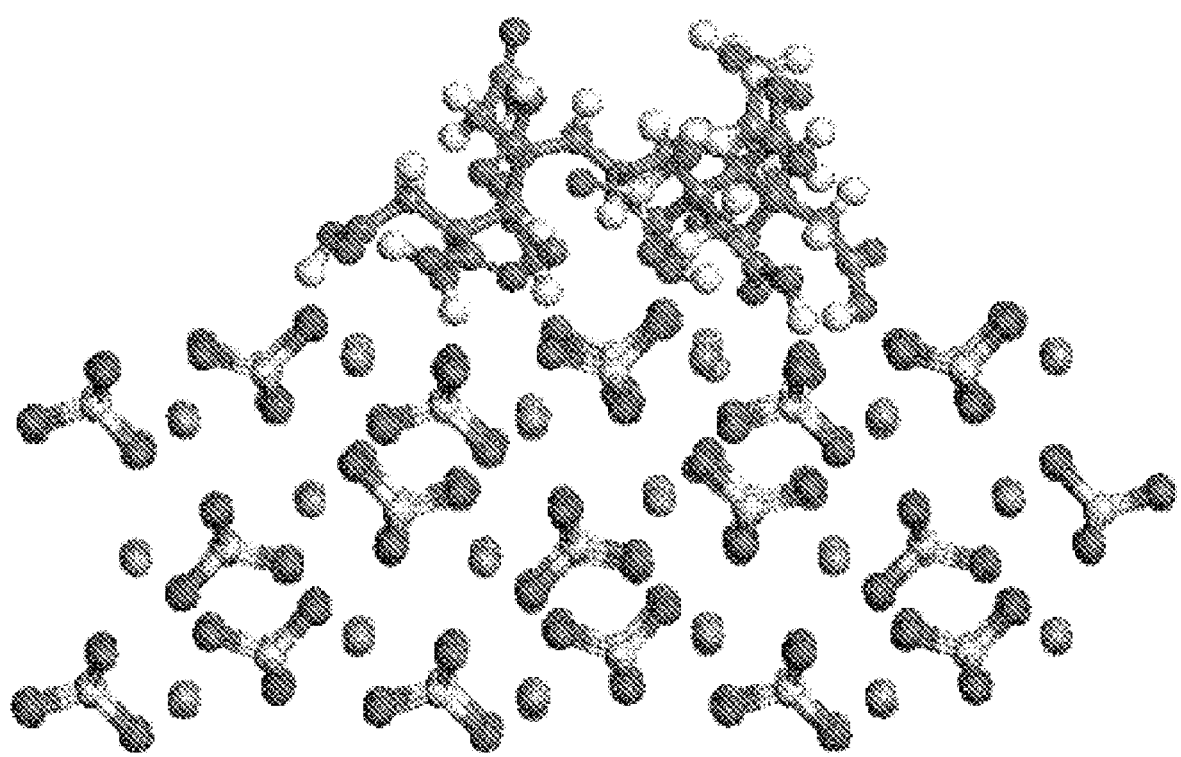

In order to determine the capacity that random terpolymers based on itaconic acid, sodium vinyl sulfonate and aconitic acid would have in order to form supramolecular complexes with barium sulfate crystals and control their growth, we proceeded to simulate through computational chemistry and using a solvated medium by water (dielectric constant 78.54) with quantum chemical methods using Density Functional Theory and the LDA-VW functional, the process of interaction from a random terpolymer based on itaconic acid, sodium vinyl sulfonate and aconitic acid, with 903 as molecular weight and polydispersity of 1, corresponding to the chemical structure of compound A, as shown in FIG. 7, with the surface D that is shown in FIG. 11 and that represents barium sulfate crystals in its polymorphic form of Barite, obtaining as result the E supramolecular complex shown in FIG. 12, and the energy results shown in Table 3.

Figure 6:
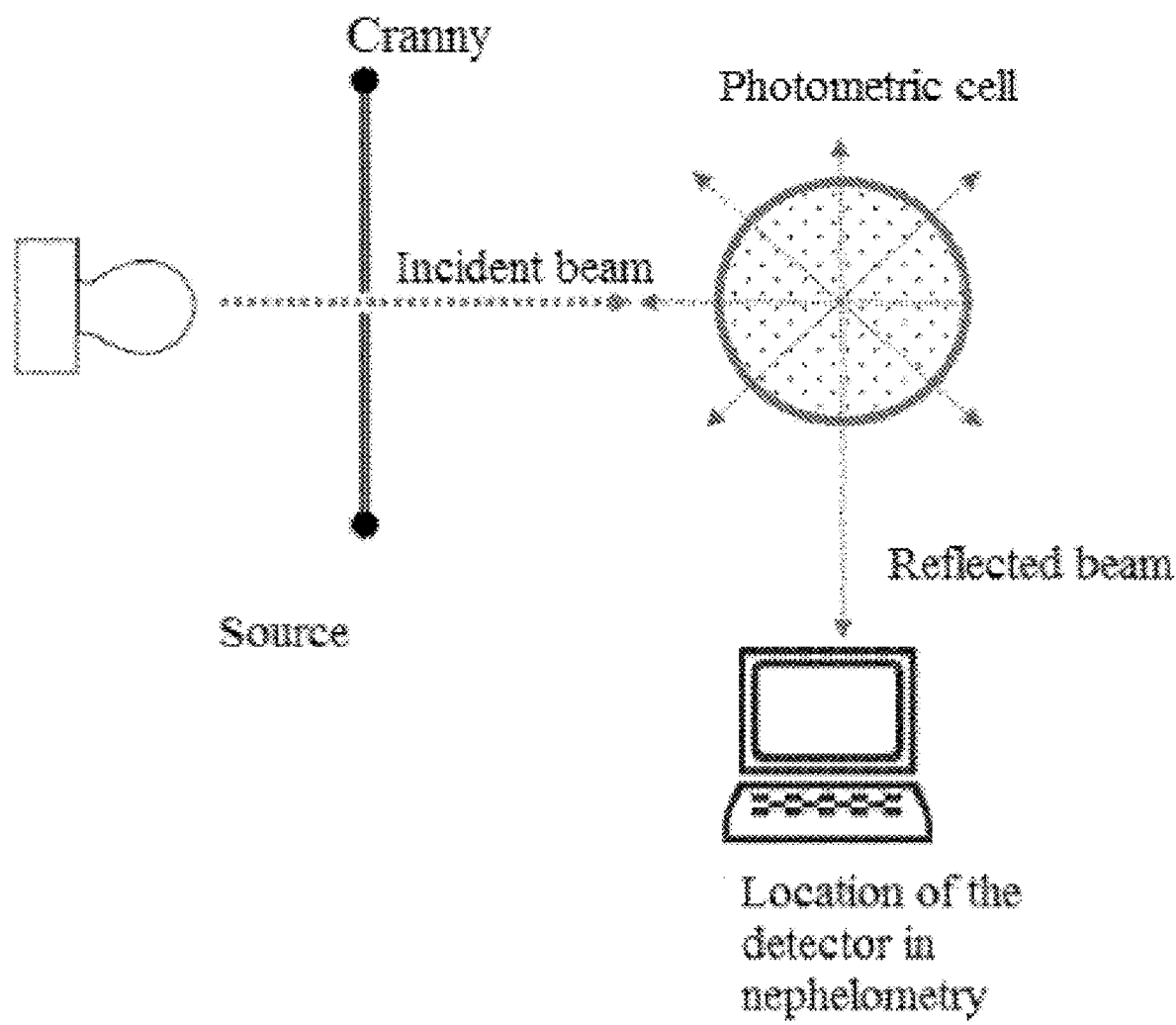
Figure 13:
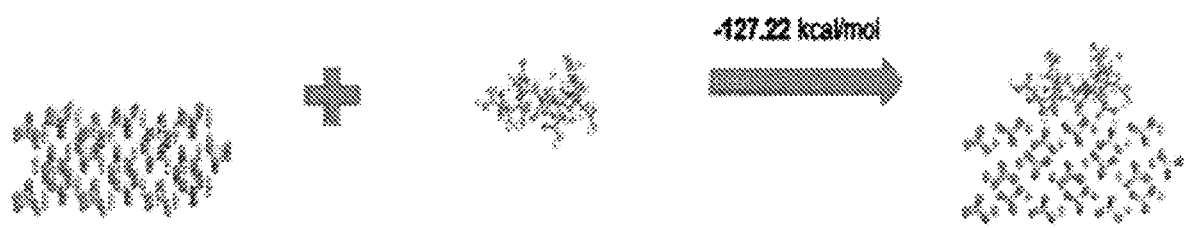

The analysis of the results in Table 3 show that the E supramolecular complex formation shown in FIG. 13 from the molecular interaction of the compound A and the D surface shown in FIGS. 6 and 11, respectively, is strongly favored from the thermodynamic point of view. Also, the interaction energy of −127.22 kcal/mol (−532.29 kJ/mol) indicated that these ion-ion supramolecular interactions and a combination of ion-dipole interactions and hydrogen bonds could be presented.

TABLE 3

Energy of compound A, Surface D and E supramolecular complex obtained through quantum chemical methods using Density Functional Theory and LDA-VW Functional.

| Compounds or Complex | Density Functional Theory, and LDA-VW Functional | |
|---|---|---|
| | Total Energy (kcal/mol) | Interaction Energy (kcal/mol) |
| A | −2,641,697.44 | |
| D | −40,730,112.93 | |
| E | −43,371,937.59 | −127.22 |

Where:
A=Random terpolymer based on itaconic acid, sodium vinyl sulphonate and aconitic acid with molecular weight of 903 AMU and polydispersity index of 1.
D=Barium sulphate surface in their polymorphic form of baryta.
E=Supramolecular complex derived from the interaction of the random terpolymer based on itaconic acid, sodium vinyl sulfonate and aconitic acid with molecular weight of 903 AMU and polydispersity of 1, corresponding to compound A (6), and the surface of barium sulphate in its polymorphic form of baryta B (7).

Determination of Interaction Between Random Terpolymer Based on Itaconic Acid, Sodium Vinyl Sulfonate and Aconitic Acid with Calcium Sulphate.

Figure 14:
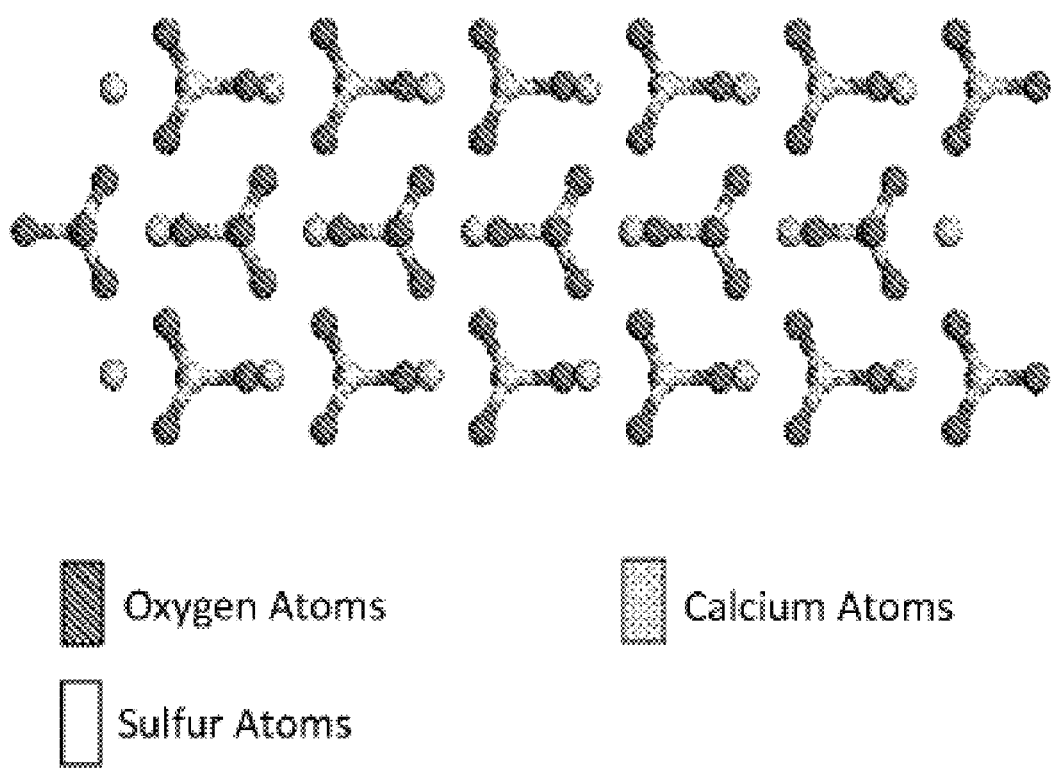
Figure 16:
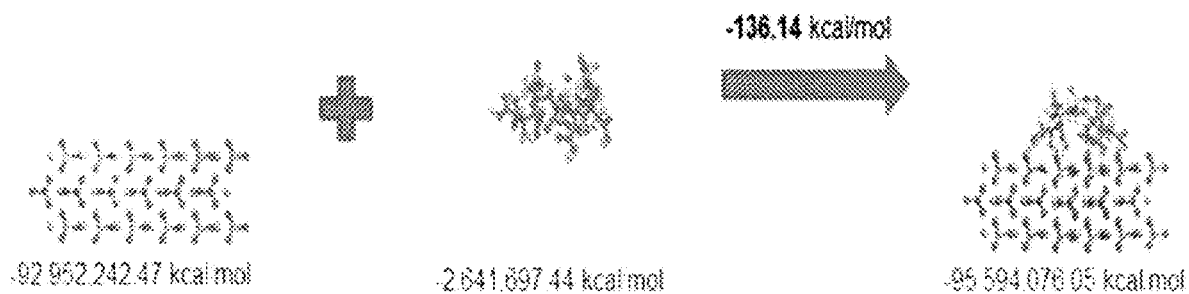

In order to determine the capacity that random terpolymers based on itaconic acid, vinyl sulfonate sodium and aconitic acid would have to form supramolecular complexes with crystals of calcium sulfate and control their growth, in a first step it was proceeded to simulate through computational chemistry and using a solvated medium by water (dielectric constant 78.54) with quantum methods employing the Density Functional Theory and LDA-VW functional the process of interaction between a random terpolymer based on itaconic acid, sodium vinyl sulfonate and aconitic acid, possessing 903 AMU as molecular weight and polydispersity index of 1, corresponding to the chemical structure of compound A, as shown in FIG. 7, with the surface F shown in FIG. 14 and representing crystals of calcium sulfate in its polymorphic form of anhydrite, obtained as result shown in the supramolecular complex G shown in FIG. 15, and the energy results that are shown in Table 4.

The analysis of the results presented in Table 4 shown show that the formation of G supramolecular complex, shown in FIG. 15, through the molecular interaction between the A compound shown in FIG. 7 and the F surface shown in FIG. 14 would be strongly favored from the thermodynamic point of view. Also, −136.14 kcal/mol (−569.61 kJ/mol) as the result of interaction energy indicated that supramolecular interactions of ion-ion type and a combination of ion-dipole interactions and hydrogen bonds would be presented.

The analysis of the results from the Tables 2 to 4 indicated that the random terpolymers based on itaconic acid, sodium vinyl sulfonate and aconitic acid (6), objects of the present invention, have the ability to form supramolecular complexes with calcium carbonate crystals in its polymorphic form of calcite, barium sulfate in its polymorphic form of barite and calcium sulfate in its polymorphic form of anhydrite; so as well control the growth and morphology change thereof.

TABLE 4

Energy of compound A, Surface D and G supramolecular complex obtained through quantum chemical methods using Density Functional Theory and LDA-VW Functional.

| Compounds or Complex | Density Functional Theory, and LDA-VW Functional | |
|---|---|---|
| | Total Energy (kcal/mol) | Interaction Energy (kcal/mol) |
| A | −2,641,697.44 | |
| D | −92,952,242.47 | |
| G | −95,594,076.05 | −136.14 |

Where:
A=Random terpolymer based on itaconic acid, sodium vinyl sulphonate and aconitic acid with molecular weight of 903 AMU and polydispersity index of 1.
D=Calcium sulphate surface in their polymorphic form of Anhydrite.
G=Supramolecular complex derived from the interaction of the random terpolymer based on itaconic acid, sodium vinyl sulfonate and aconitic acid with molecular weight of 903 AMU and polydispersity index of 1, corresponding to compound A (6), and the surface of calcium sulphate in its polymorphic form of Anhydrite D (14).

Random Terpolymer Synthesis and Spectroscopic Characterization.

The random terpolymer based on itaconic acid, aconitic acid or its isomers and sodium vinyl sulfonate having the structural formula (5), object of the present invention are obtained by means of a polymerization process in aqueous solution via free radicals and a redox system as initiator. The polymerization is carried out at an acid pH in the range of 1.0 to 3.5, under atmospheric pressure and at temperatures ranging from 50 to 100° C. The obtained terpolymers are characterized for having a low polydispersity index ranging from 1 to 1.4 and low average molecular weights under 31,000 AMU.

EXAMPLES

The following examples will serve to illustrate the synthesis of the random terpolymer base on itaconic acid, aconitic acid or its isomers and sodium vinyl sulfonate object of the present invention.

Example 1 (Product 1)

In a 1000 mL four-mouth round flask with a magnetic stirrer, a condenser, an addition funnel and a thermometer, 298 g of a solution containing 25% by weight of sodium vinyl sulfonate, 60 g of itaconic acid and 100 g of aconitic acid are mixed at room temperature and atmospheric pressure. Afterwards, the reaction mixture is stirred vigorously and heated up to a temperature of 90° C. under atmospheric pressure in order to obtain a mixture with homogeneous and clear appearance. Once these conditions are attained, 1.24 g of ammonium ferric sulphate dodecahydrate are added and vigorous stirring is maintained for 10 minutes. At a temperature of 90° C., 167 g of an aqueous solution containing 35% by weight of hydrogen peroxide is added to the system.

The reaction is exothermic so the temperature of the system was held at 92° C. (+/−2° C.). Once the addition process is completed, the reaction mixture is maintained under vigorous stirring and at a temperature of 92° C. (+/−2° C.), for 6 hours, time after which, 640 g of a clear reddish liquid are obtained, which contains the random terpolymer derived from itaconic acid, aconitic acid or its isomers and sodium vinyl sulfonate referred to as product 1, with and average molecular weight of 984 AMU by number, an average molecular weight of 1090 AMU by weight and a polydispersity index of 1.11. These values were obtained by means of size exclusion chromatography (SEC) using a chromatography column with the trade name plaquagel MIXED-OH and an aqueous solution comprising sodium nitrate (0.2 M) and sodium phosphate, monobasic (0.01 M) al a pH of 7 as the mobile phase. Spectroscopic characteristics are the following: FTIR (cm⁻): 3431, 2942, 1714, 1402, 1155, 1036 y 724 (FIG. No. 1). $^1$H NMR (D$_2$O), 200 MHz, δ (ppm): multiple signals at the 1.77 a 2.37, 2.38 a 3.25, 3.93 (FIG. No. 2). $^{13}$C NMR (D$_2$O), 50 MHz, δ (ppm): signals at the 21.5 a 33.3, 37.5 a 46.5, 50.5 a 65.7 y 174.3 a 177.1 (FIG. No. 3).

Example 2 (Product 2)

In a 1000 mL four mouth round flask supplied with a magnetic stirrer, a condenser an addition funnel and a thermometer, 298 g a solution containing 25% by weight of sodium vinyl sulfonate, 149 g of itaconic acid and 100 g of aconitic acid are mixed at room temperature and atmospheric pressure. Afterwards, the reaction mixture is stirred vigorously and heated up to a temperature of 90° C. under atmospheric pressure in order to obtain a mixture with a homogeneous and clear appearance. Once these conditions are attained, 1.62 g of ammonium ferric sulphate dodecahydrate is added and vigorous stirring is maintained for 10 minutes. At a temperature of 90° C., 167 g of an aqueous solution containing 35% by weight of hydrogen peroxide is added to the system. The reaction is exothermic so the temperature of the system was held at 92° C. (+/−2° C.). The reaction is exothermic so the temperature of the system was held at 92° C. (+/−2° C.). Once the addition process is completed, the reaction mixture is maintained under vigorous stirring and at a temperature of 92° C. (+/−2° C.), for 6 hours, time after which, 838 g of a clear reddish liquid are obtained, which contains the random terpolymer derived from itaconic acid, aconitic acid or its isomers and sodium vinyl sulfonate referred to as product 2, with and average molecular weight of 918 AMU by number, an average molecular weight of 1010 AMU by weight and a polydispersity index of 1.11. These values were obtained by means of size exclusion chromatography (SEC) using a chromatography column with the trade name plaquagel MIXED-OH and an aqueous solution comprising sodium nitrate (0.2 M) and sodium phosphate, monobasic (0.01 M) al a pH of 7 as the mobile phase. Spectroscopic characteristics are the following: FTIR (cm⁻¹): 3431, 2939, 1713, 1407, 1154, 1036 y 71. $^1$H NMR (D$_2$O), 200 MHz, δ (ppm): multiple signals at the 1.77 a 2.33, 2.72 a 3.02, 3.37 a 3.44. $^{13}$C NMR (D$_2$O), 50 MHz, δ (ppm): signals at the 23.2 a 31.5, 39.9 a 43.6, 49.1 a 58.5 y 176.9 a 181.4 intervals.

Example 3 (Product 3)

In a 1000 mL four mouth round flask supplied with a magnetic stirrer, a condenser an addition funnel and a thermometer, 298 g a solution containing 25% by weight of sodium vinyl sulfonate, 37.3 g of itaconic acid and 100 g of aconitic acid are mixed at room temperature and atmospheric pressure. Afterwards, the reaction mixture is stirred vigorously and heated up to a temperature of 90° C. under atmospheric pressure in order to obtain a mixture with a homogeneous and clear appearance. Once these conditions are attained, 1.06 g of ammonium ferric sulphate dodecahydrate is added and vigorous stirring is maintained for 10 minutes. At a temperature of 90° C., 142 g of an aqueous solution containing 35% by weight of hydrogen peroxide is added to the system. The reaction is exothermic so the temperature of the system was held at 92° C. (+/−2° C.). Once the addition process is completed, the reaction mixture is maintained under vigorous stirring and at a temperature of 92° C. (+/−2° C.), for 6 hours, time after which, 575 g of a clear reddish liquid are obtained, which contains the random terpolymer derived from itaconic acid, aconitic acid or its isomers and sodium vinyl sulfonate referred to as product 3, with and average molecular weight of 1061 AMU by number, an average molecular weight of 1220 AMU by weight and a polydispersity index of 1.15. These values were obtained by means of size exclusion chromatography (SEC) using a chromatography column with the trade name plaquagel MIXED-OH and an aqueous solution comprising sodium nitrate (0.2 M) and sodium phosphate, monobasic (0.01 M) al a pH of 7 as the mobile phase. Spectroscopic characteristics are the following: FTIR (cm⁻¹): 3431, 2939, 1713, 1407, 1154, 1036 y 715. $^1$H NMR (D$_2$O), 200 MHz, δ (ppm): multiple signals at the 1.77 a 2.33, 2.72 a 3.02, 3.37 a 3.44. $^{13}$C NMR (D$_2$O), 50 MHz, δ (ppm): signals at the 23.2 a 31.5, 39.9 a 43.6, 49.1 a 58.5 y 176.9 a 181.4 intervals.

3) Experimental Evaluation of Mineral Salts Scale Inhibiting and Dispersing Properties of the Random Terpolymers.

The assessment of the terpolymer anti-scaling and dispersant capabilities were performed by means of five different tests: a) Determination of calcium sulfate scale inhibition, b) Determination of calcium sulfate and carbonate crystal distortion and modification by scanning electron microscopy, c) Determination of calcium carbonate scale inhibition in a medium with the characteristics of cooling systems d) Determination of efficiency as inorganic salts dispersant, e) Determination of mineral scale inhibition of calcium carbonate and calcium sulphates, barium and strontium, f) Determination of prevention and remediation of formation damage by calcium sulphate precipitation with incompatible brine mixture in a limestone cores under high temperature, high pressure and high salinity conditions.

a) Determination of Calcium Sulfate Mineral Scale Inhibition. For Calcium Sulfate.

The method consists in mixing two solutions to induce the formation of calcium sulfate.

1.—Two solutions are prepared containing the calcium and sulfate ions, respectively.
 a) Solution containing calcium ions: it contains 7.5 gL⁻¹ of NaCl and 11.1 gL⁻¹ of CaCl$_2$.2H$_2$O.
 b) Solution containing sulfate ions: it contains 7.5 gL⁻¹ of NaCl and 10.66 gL⁻¹ of NA$_2$SO$_4$.

2.—The desired inhibitor concentration is prepared in the solution containing the sulphate ions.

3.—10 mL of each solution and the desired inhibitor concentration are mixed and everything is poured into a 25 mL hermetically sealed vial.

4.—The vials are placed in an oven for 24 hours at a constant temperature of 70° C.

5.—After 24 hours, the vials are allowed to cool down to room temperature. Solids that may have been formed are filtered and a 1 ml sample is taken and completed to 10 ml with ultra-pure water.

6.—The solution is analyzed by means atomic absorption, in order to obtain the remaining concentration of calcium ions in the solution. A control is prepared, containing only the amount of calcium ions present in the blank. The inhibition percentage was estimated with the expression (1).

$$\% \text{ Inhibition} = \frac{Ca^{+2}_{sample\text{-}after\text{-}the\text{-}precipitation\text{-}ion} - Ca^{+2}_{Reference\ after\text{-}the\text{-}lprecipitation}}{Ca^{+2}_{control} - Ca^{+2}_{Reference\text{-}after\text{-}the\text{-}precipitation}} * 100 \quad (1)$$

Example 4

The determination of the calcium sulfate scale inhibitory capability was carried out for product 1 and 3. Table 5 shown the results for product 1 and 3 at different concentrations for products 1 and 3 and the derived copolymer from itaconic acid/sodium vinyl sulfonate (proportion 1:3).

TABLE 5

Calcium sulphate inhibition results

| Product | Concentration | Calcium concentration (ppm) | Efficiency (%) |
|---|---|---|---|
| Control solution | — | 1509 | — |
| Reference | — | 1012 | 0 |
| Producto 1 | 200 | 1495 | 97.2 |
|  | 400 | 1500 | 98.2 |
|  | 600 | 1504 | 98.9 |
| Producto 5 | 200 | 1493 | 96.8 |
|  | 400 | 1501 | 98.4 |
|  | 600 | 1503 | 98.8 |
| Derived Copolymer from itaconic acid/ sodium vinyl sulphonate (1:3 ratio) | 200 | 1410 | 81.0 |
|  | 400 | 1425 | 83.1 |
|  | 600 | 1430 | 84.1 |

A comparison of the results obtained with the terpolymers described as products 1 and 3, with the derived copolymer based on itaconic acid/sodium vinyl sulphonate in 1:3 ratio that it was described in the Mexican Patent Application MX/a/2013/004644 which shown that new terpolymers have a better performance and that the chemical structure is a key element in the development of new anti-scaling agents with improved properties. It is a key element in the development of new anti-scaling agents with improved properties.

c) Determination of Calcium Sulphate and Carbonate Crystals Distortion or Modification by Scanning Electron Microscopy.

The solutions containing the calcium and sulphate ions are the following:

i. Solution containing the calcium ions: it contains: 7.5 $gL^{-1}$ de NaCl and 21.32 $gL^{-1}$ of $CaCl_2.2H_2O$.
ii. Solution containing the sulphate ions: it contains: 7.5 $gL^{-1}$ de NaCl and 21.32 $gL^{-1}$ of $Na_2SO_4$.

1.—The desired inhibitor concentration is prepared in the solution containing the sulphate ions.

2.—10 ml of each solution and the desired inhibitor concentration are mixed and everything is poured into a 25 mL hermetically sealed tube.

3.—The tubes are placed in an oven for 24 hours at a constant temperature of 70° C.

4.—After 24 hours, the containers are allowed to cool down to room temperature without exceeding 2 hours. Subsequently the solids formed are filtered.

5.—Solids formed in the tubes are analyzed and their morphology is observed by scanning electron microscopy (SEM).

Example 5

In order to determine the effect of the terpolymers derived from the present invention on calcium sulphate crystals, product 1 was evaluated using two brines with high concentrations of calcium and sulphate ions.

FIG. 4 shows the images and compositions of the crystals resulting from the mixture of the solution for.

a) without chemical product and b) with 200 ppm of product 1. Noteworthy, it is possible to observe clearly how the product 1 breaks up and distorts the calcium sulphate crystals, thereby inhibiting the growth of larger crystals.

For Calcium Carbonate

Solutions containing the calcium and bicarbonate ions are the following:

a) Solution containing the calcium ions: 12.15 $gL^{-1}$ $CaCl_2.2H_2O$, 3.68 $gL^{-1}$ $MgCl_2.6H_2O$ and 33 $gL^1$ de NaCl.
b) Solution containing the bicarbonate ions: 7.36 $gL^{-1}$ de $NaHCO_3$ and 33 $gL^{-1}$ of NaCl.

2.—The desired inhibitor concentration is prepared in the solution containing the bicarbonate ions.

3.—10 mL of each solution and the desired inhibitor concentration are mixed and everything is poured into a 25 mL hermetically sealed tube.

4.—The tubes are placed in an oven for 24 hours at a constant temperature of 70° C.

5.—After 24 hours, the tubes are allowed to cool down to room temperature without exceeding 2 hours. Solids that may have formed are filtered.

6.—Solids formed in the tubes are analyzed and their morphology is observed by scanning electron microscopy (SEM).

Example 6

In order to determine the effect of the derived terpolymers from the present invention on calcium carbonate crystals, product 1 was evaluated using two brines with high concentrations of calcium and bicarbonate ions.

FIG. No. 5 shows the images and compositions of the crystals resulting from the mixture of the solutions without chemical product and from the mixture of the solutions with product 1, for: a) without chemical product and at 200 ppm concentration of product 1.

It is possible to observe clearly how product 1 breaks up and distorts the calcium carbonate crystals at the concentration of 200 ppm, thereby inhibiting the growth of the crystals. Furthermore, the chemical compound obtained by means of chemical analysis shows the presence of sulfur in all solids, which confirms the presence of product 1 and hence the formation of supramolecular complexes and their effect on the calcium carbonate crystals morphology distortion.

c) Determination of Inhibition of the Characteristic Calcium Carbonate Scale ($CaCO3$) of a Cooling System.

This method determines the efficiency of calcium carbonate salts scale inhibitors.

Preparation of Solutions

Sodium carbonate solution ($Na_2CO_3$)

0.424 g of $Na_2CO_3$ is weighted in 1 L of demineralized water.

Calcium chloride solution ($CaCl_2$)

0.444 g of $CaCl_2$ is weighted in 1 L of demineralized water.

Preparation of Samples.
1. 100 mL of the $Na_2CO_3$ solution are poured in a 250 mL flask with an air-tight cap.
2. The concentration to be evaluated is added in mL (ppm).
3. 100 mL of the $CaCl_2$ solution are poured and the flask is shaken.
4. A blank is prepared as in points 1 and 3 composed of $Na_2CO_3$ and $CaCl_2$ solutions without inhibitor and shaken.
5. All the flasks are closed and placed in the oven for 24 hours at 70° C.
6. Once the testing time is completed, the flasks are removed from the oven and left to cool down.
7. A reference solution without inhibitor composed of $NaCO_3$ and $CaCl_2$ solutions is prepared as in points 1 and 3.
8. The amount of calcium ions in solution is determined for the stock solution, for the blank and for the samples.

Table 6 shows a summary of the testing conditions.

TABLE 6

| Testing conditions | |
| --- | --- |
| Calcium Hardness ($CaCO_3$) | 200 ppm |
| Temperature | 70° C. |
| Test time | 24 h |
| Scale inhibitor concentration | 5 and 10 ppm |

Determination of Hardness as $CaCO_3$.
1. An aliquot is taken from the center of the sample bottle at room temperature and at rest without having shaken since its removal from the oven.
2. The amount of calcium ions is determined by titration with EDTA (ethylenediaminetetraacetic acid disodic salt).

Efficiency Percentage Calculation:

$$\text{Efficiency} = \frac{\text{sample } EDTA \text{ mL spent} - \text{blank } EDTA \text{ mL spent}}{\text{Reference solution } EDTA \text{ mL spent} - \text{blank } EDTA \text{ mL spent}} * 100$$

Example 7

The determination of the inhibitory capability of calcium carbonate scale typical of cooling systems was carried out for products 1 and 2 and for polymers commercially used as scale inhibitors. Following Table 7 shows the efficiency results at different concentrations

TABLE 7

| Efficiency results of polymers as scale inhibitors | | |
| --- | --- | --- |
| Sample | Efficiency at 5 ppm | Efficiency at 10 ppm |
| Poly (acrylic acid) | 63.8 | 81.6 |
| Product 1 | 93.5 | 95.1 |
| Product 2 | 92.4 | 94.1 | d) Determination of Efficiency as Inorganic Salts Dispersants

These methods consist in determining the performance of the synthesized terpolymers to disperse calcium carbonate, iron oxides and clays through the measurement of turbidity in NTU (nephelometric turbidity units), where the dispersant action is more efficient at higher turbidity values. The measurement is founded on applying the nephelometric technique using a photometer (FIG. No. 6). The standard method is based on the comparison of the amount of light dispersed by colloidal particles present in a water sample, with the intensity of the light emerging through the same sample. Turbidity is expressed in turbidity units (NTU), where a turbidity unit equals a formalin suspension in water with a concentration of 1 ppm. The measurements of turbidity allow evaluating the dispersant effect for the polymeric chains.

Calcium Carbonate Dispersion Evaluation

For this test, it was employed a brine with a hardness of 200 ppm as calcium carbonate from sodium carbonate and calcium chlorides salts, and 750 ppm reactive-degree calcium carbonate was added in order to measure the effect of the terpolymer on calcium carbonate dispersion, at a dispersant concentration of 10 ppm for a 2 hours as period time.

Example 8

The determination of the characteristic calcium carbonate dispersant capability was carried out for the product 1. The dispersant effect results for the product 1 of the present invention and for a commercial polymer used as inorganic salts dispersants and their respective molecular weights are shown in Table 8. The results show that the product 1 work better at dispersing calcium carbonate than acrylic poly (acrylic acid).

TABLE 8

| Turbidity results. | |
| --- | --- |
| Sample | Turbidity (NTU) |
| Poly (acrylic acid) | 23.5 |
| Product 1 | 152.1 |

Iron Oxide Dispersion Assessment.

One of the problems that most affect aqueous systems is the presence of iron oxides, due to the dissolution of metal by corrosion effects. This method consists in evaluating the dispersant power of the synthesized terpolymer as follows: A solution is prepared with hardness as calcium carbonate of 200 ppm, 750 ppm of iron oxide and with the dispersant product added. The mixture is shaken and left to rest for a 4 hour time period. At the conclusion of the test, an aliquot is taken and turbidity is measured.

Example 9

The determination of the iron oxide-dispersant capability was carried out for the product 1 at 25 ppm of concentration. The results of the iron oxide dispersion test by the product 1 of the present invention and by a commercial polymer used as inorganic salts dispersants and their respective molecular weights are shown in Table 9.

Table 9 results show that product 1 work better than the poly (acrylic acid).

TABLE 9

Turbidity results.

| Sample | Turbidity (NTU) |
|---|---|
| Poly (acrylic acid) | 345.2 |
| Product 1 | 750.3 |

Clay Dispersion Assessment

For the purpose of this test, brine with a hardness of 200 ppm as calcium carbonate and 1000 ppm of clay (kaolin) was prepared by putting these substances in contact and adding the dispersant, prepared at a 25 ppm concentration. Once mixed, the compounds is vigorously stirred in a magnetic stirring plate for 5 minutes and left to rest for 2 hours; once this time is elapsed, the respective turbidity measurements are performed.

Example 10

A determination of the clay-dispersing capability was carried out for the product 1 at 25 ppm as concentration. The results of the clay (kaolin) dispersion test for the product 1 of the present invention and for a commercial polymer used as inorganic salts dispersants are shown in Table 10.

TABLE 10

Results of turbidity.

| Sample | Turbidity (NTU) |
|---|---|
| Poly (acrylic acid) | 550.6 |
| Product 1 | 850.1 |

Table 10 results show that product 1 of the present invention perform better at dispersing clays than the poly (acrylic acid) which is commonly used as inorganic salts dispersants.

e) Determination of the Mineral Scale Inhibition of Calcium Carbonate and Calcium, Barium and Strontium Sulfates Scale Inhibition.

This evaluation involves the mixture preparation of 20 mL sea water and connate water in a 3 to 1 ratio. The mixture water is heated at 70° C. for 8 hours and then observed whether or not crystals forming.

The product to evaluate is added into the sea water at the required concentration.

Tables 11 and 12 show the brines compositions employed in this experiment.

The product to evaluate is added into the sea water at the required concentration.

Tables 11 and 12 show the brines compositions employed in this experiment.

TABLE 11

Compositions of the brines

| | Sea water | Connate water |
|---|---|---|
| Cations | mgL$^{-1}$ | mgL$^{-1}$ |
| Sodium | 11742 | 59809 |
| Calcium | 448 | 31880 |
| Magnesium | 1288 | 1944 |
| Iron | 0.1 | 0.1 |
| Barium | — | 25.37 |
| Strontium | 7.84 | 1450 |
| Anions | mg/L | mg/L |
| Chlorides | 19900 | 154000 |
| Sulfates | 3650 | 300 |
| Carbonates | 13 | 0 |
| Bicarbonates | 84 | 149 |

TABLE 12

Brines hardness and salinity

| | Sea Water (mgL$^{-1}$) | Connate Water (mgL$^{-1}$) |
|---|---|---|
| Total hardness as CaCO$_3$ | 6420 | 87700 |
| Salinity as NaCl | 32804 | 253859 |

Example 11

The qualitative determination of calcium carbonate inhibition and calcium sulfate, barium and strontium was made for the Product 1.

The results are shown in Table 13.

TABLE 13

| | Crystal Formation |
|---|---|
| Reference | High amount |
| Product 1 | No evidencie |

Determination of Prevention and Remediation of Damage Caused by Calcium Sulphate Precipitation with Incompatible Mixture of Brines in Limestone Cores at High Temperature and High Salinity Conditions Prevention of damage by calcium sulphate precipitation in limestone cores at reservoir conditions.

The damage-prevention study was carried out using brines 1 and 2, the composition of which is shown in Table 14.

TABLE 14

Composition of the brines

| | Brine 1 mg/L | Brine 2 mg/L |
|---|---|---|
| Cations | | |
| Sodium | 2949 | 2949 |
| Calcium | 3020 | — |
| Anions | | |
| Chlorides | 4551 | 4551 |
| Sulphates | — | 10080 | f) Procedure

1.—In a limestone saturated cores with brine 1 at 150° C. and 2000 psi, permeability was determined under such conditions.

2.—Subsequently, brine 2 enriched with chemical product 1 from the present invention was injected to the limestone cores saturated with brine 1 in order for them come in contact and, afterwards, permeability was measured under the temperature and pressure conditions described in point 1.

Example 12

The damage remediation by precipitation of calcium sulfate in limestone core at reservoir conditions.

Remediation of Damaged Caused by Calcium Sulphate Precipitation in Calcite Cores at Reservoir Conditions.

The damage-prevention study by calcium sulphate precipitation was carried out at 150° C. and 2000 psi in a incompatible mixture brines (Brine 1 and 2) from the terpolymer described in Example 1 (product 1) according to this following procedure:

1.—In a calcite saturated core with brine 1 at 150° C. and 2000 psi, permeability was determined under such conditions.
2.—Subsequently, brine 2 was injected to the limestone cores saturated with brine 1 in order for them come in contact and, afterwards, permeability was measured under the temperature and pressure conditions described in point 1.
3.—Finally the brine 2 containing 200 ppm of product 1 was injected to the calcite core and the permeability was measured.

Permeability at the beginning of the test with the limestone core saturated with brine 1 yielded a result of 55 mD, and with the mixture of brine 1 and 2 enriched with 200 ppm of product 1, permeability was 57 mD.

This fact indicates that the injection of product 1 to the calcite core had prevented the damage and even had an 3% increase in the initial permeability.

Example 13

The effect of terpolymer described in Example 1 (product 1) was determined in the prevention of damage caused by calcium sulfate in calcites cores at 150° C. and 2000 psi due to a mixture of incompatible brines and after to the product 1 injection.

The effect of terpolymer described in Example 1 (product 1) was determined in the prevention of damage caused by calcium sulfate in calcites cores at 150° C. and 2000 psi due to a mixture of incompatible brines and after to the product 1 injection. The compositions of brine are shown in Table 14.

Permeability at the beginning of the test with the calcite core saturated with brine 1 yielded a result of 58 mD, and with the mixture of brine 1 and 2, permeability was 27 mD. This fact indicated that the incompatibility of brines generated a 47% reduction in permeability.

When brine 2 additivities with 200 ppm of the product 1, was injected, the permeability was 62 mD, so there was an increase of 6.9% compared to the initial permeability (58 mD) system.

Assessment of Acute Toxicity with *Daphnia magna* and *Artemia franciscana*.

This method is applicable to acute toxicity assessment in water and water soluble substances. In fresh water bodies, industrial and municipal wastewater, agricultural runoff and pure or combined substances or lixiviates and the solubilizable fraction in soils and sediments.

Within the cladocera group, the *Daphnia* gender species are the most widely used as bioindicators in toxicity tests, due to their wide geographic distribution, the important role they play within the zooplankton community, and because they are easy to culture in a laboratory and they are responsive to a wide range of toxics.

The acute toxicity determination was carried out by means of the Mexican NMX-AA-0087-SCFI-2010 standard, which establishes the method for measuring acute toxicity, using the freshwater organism *Daphnia magna* (Crustacea-Cladocera) and the *Artemia franciscana* organism.

Example 14

The acute toxicity determination was carried out with *Daphnia magna* for product 1, using the testing procedure established and described in the NMX-AA-087-2010 standard. Table 15 shows the average toxicity result of a total of three repetitions. The acute toxicity result indicates that the product 1 is in the category of not particularly toxic The result indicates that acute toxicity of the product 1 is in the category of particularly not toxic for the organism *Daphnia magna* sweet aquaculture.

TABLE 15

Toxicity to *Daphnia magna*.

| Chemical product | $CL_{50}$ (ppm) | *Toxicity Category |
|---|---|---|
| Product 1 | 102 | Particularly Non-toxic |
|  | 101 | Particularly Non-toxic |
|  | 100 | Particularly Non-toxic |
| Average | 101 | Particularly Non-toxic |

*Concentration range in ppm, classification$^a$, category 5: 0.01-0.10, extremely toxic; 4: 0.1-1.0, highly toxic; 3: 1-10, moderately toxic; 2: 10-100, slightly toxic; 1: 100-1000, particularly non-toxic and 0: >1000; non-toxic.
*CNS (UK) toxicity category for the application of chemical products used in hydrocarbon production in the North Sea.

In addition to these facts, based on the NRF-005-PE-MEX-2009 Mexican standard, where it is established that to use chemicals products in the oil industry it must meet the following environmental criteria.

For sweet environment for aquaculture, using *Daphnia magna* the limit in units of microorganism toxicity (UT), must not exceed 20 units. The toxicity units (UT) are calculated with CL50 value from the test toxicity, from the following relationship:

$$UT=(1/CL_{50})\times 100$$

Where:

TU=Acute toxicity units $CL_{50}$=Inhibitor concentration (in mgL-1 that causes the mortality of 50% of exposed organism).

Therefore, the terpolymer of the present invention has a TU=0.32, and hence it meets the Mexican NRF-005-PE-MEX-2009 standard and can be used in equipment and pipelines of oil and chemical industry that uses fresh water and is built in land

Example 15

The acute toxicity determination was carried out with *Artemia franciscana* for product 1, using the test procedure established and described in the NMX-AA-087-2010 standard. Table 16 shows the average toxicity result of a total of three repetitions.

TABLE 16

Toxicity to *Artemia franciscana*.

| Chemical product | $CE_{50}$ (ppm) | *Toxicity Category |
|---|---|---|
| Product 1 | 220 | Particularly Non-toxic |
|  | 218 | Particularly Non-toxic |
|  | 221 | Particularly Non-toxic |
| Average | 219.7 | Particularly Non-toxic |

*Concentration range in ppm, classification*, category 5: 0.01-0.10, extremely toxic; 4: 0.1-1.0, highly toxic; 3: 1-10, moderately toxic; 2: 10-100, slightly toxic; 1: 100-1000, particularly non-toxic and 0: >1000, non-toxic.
*CNS (UK) toxicity category for the application of chemical products used in hydrocarbon production in the North Sea.

The acute toxicity result indicates that product 1 is particularly non-toxic to the *Artemia franciscana* organism. Moreover, based on the Mexican NRF-005-PEMEX-2009 standard, which establishes that, in order chemical products to be suitable for use in the oil industry, they must meet the following environmental criterion. For sea water environments, using the *Artemia franciscana* microorganism, the maximum limit in toxicity units should not be higher than 2.

Therefore, the terpolymer of the present invention has a TU=0.46, and hence it meets Mexican NRF-005-PE-MEX.2009 standard and can be used in equipment and pipelines of oil and chemical industry that used sea water or formation water from oil reservoirs and that is built offshore.

Determination of Acute Toxicity by Means of the Microtox Method.

The microtox bacterial bio-assay, designed by Strategic Diagnostic Inc. (Azur Environmental) is based on monitoring changes in the emissions of natural light by a luminescent bacteria, *Vibrio fischeri* (*Photobacterium phosphoreum*).

The Microtox assay measures the acute toxicity of the test substance present in aqueous solution that uses a suspensión of approximately one million of luminescent bacteria (*Photobacterium Phosphoreum*) as test organism. The suspension of micro-organisms is added to a series of tubes of dilutions at controlled temperature with different concentrations of the test substance, to subsequently read, in a photometric device, the intensity of light emitted by each dilution, considering a reference blank where the test substance is not present.

With the obtained data, a dose-response graph can be drawn, by means of which the $CE_{50}$ value is a measure of the decrease in the light emitted by the bioluminescent bacteria by means of the analyzing equipment, and specifically represents the concentration at which a 50 percent decrease of the light was obtained, with regard to a reference blank. Concretely, the $CE_{50}$ value indicates the relative toxicity of the test substance.

Example 16

The determination of acute toxicity was carried out with *Vibrio fischeri* (*Photobacterium phosphoreum*) for the product 1, using the test procedure established in the NMX-AA-112-1995-SCFI Mexican standard, used for the assessment of toxicity of natural and residual waters, as well as pure of combined substances, by means of the bio-luminescent bacteria *Photobacterium phosphoreum*. Table 17 shows the average toxicity result of a total of three repetitions.

TABLE 17

| $CE_{50}$ 15 min. (ppm) | *Toxicity Category |
|---|---|
| 21.8 | Slightly toxic |
| 21.6 | Slightly toxic |
| 21.7 | Slightly toxic |

Toxicity results shown in Table 17 indicate that the derived product 1 from the Example 1 is slightly toxic for *Photobacterium phosphoreum* bioluminescent bacteria.

What is claimed is:

1. An aqueous polymerization process for producing a random terpolymer, comprising:
   a) diluting monomers in an aqueous medium having an acidic pH and stirring and heating the monomers in the aqueous medium up to a temperature of about 90° C. until a mixture with a homogenous appearance is obtained;
   b) adding an iron salt comprising ferric ammonium sulfate to the mixture to form free radicals;
   c) adding an initiator at a controlled temperature of about 90° C.; and
   d) agitating the system at a constant temperature greater than 82.5° C. to 100° C. and atmospheric pressure for a time of at least about four hours until a clear reddish liquid is obtained,
   wherein the random terpolymer is derived from at least one of itaconic acid or isomers, aconitic acid, or alkenyl sulphonates; and wherein the random terpolymer has an average molecular weight by number of less than 1500 AMU.

2. The process of claim 1, wherein in that the initiator is a redox system.

3. The process of claim 2, wherein the redox system has an initiator comprising hydrogen peroxide.

4. The process of claim 3, wherein the redox system includes hydrogen peroxide and ferric ammonium sulfate.

5. The process of claim 1, wherein the pH of the aqueous solution is between about 1.0 to about 3.5.

6. The process of claim 1, wherein a reaction time of the polymerization process is between about 4 to 24 hours.

* * * * *